US008478935B2

(12) United States Patent
Kurokawa

(10) Patent No.: US 8,478,935 B2
(45) Date of Patent: Jul. 2, 2013

(54) PROGRAM, METHOD, AND DEVICE FOR COMMUNICATION PROCESSING

(75) Inventor: Kazushige Kurokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 213 days.

(21) Appl. No.: 12/411,102

(22) Filed: Mar. 25, 2009

(65) Prior Publication Data
US 2009/0187708 A1 Jul. 23, 2009

Related U.S. Application Data

(63) Continuation of application No. PCT/JP2006/325429, filed on Dec. 20, 2006.

(51) Int. Cl.
G06F 12/00 (2006.01)

(52) U.S. Cl.
USPC .............................. 711/114; 714/4.1; 710/35

(58) Field of Classification Search
None
See application file for complete search history.

(56) References Cited

U.S. PATENT DOCUMENTS

| 7,093,155 | B2* | 8/2006 | Aoki | 714/4.11 |
|---|---|---|---|---|
| 7,434,094 | B2 | 10/2008 | Fujita et al. | |
| 7,451,341 | B2* | 11/2008 | Okaki et al. | 714/4.1 |
| 7,702,786 | B2* | 4/2010 | Bayus et al. | 709/225 |
| 2004/0107300 | A1 | 6/2004 | Padmanabhan et al. | |
| 2005/0120259 | A1 | 6/2005 | Aoki | |
| 2006/0075156 | A1 | 4/2006 | Okaki et al. | |

FOREIGN PATENT DOCUMENTS

| JP | A 6-110800 | 4/1994 |
|---|---|---|
| JP | A 2000-132413 | 5/2000 |
| JP | 2000-284982 A | 10/2000 |
| JP | A 2001-5744 | 1/2001 |
| JP | 2003-131897 A | 5/2003 |
| JP | A 2006-309506 | 11/2006 |

OTHER PUBLICATIONS

Supplemental European Search Report issued on Feb. 1, 2011, in EP 06 83 5049.
Japanese Office Action mailed May 10, 2011 for corresponding Japanese Application No. 2008-550017, with Partial English-language Translation.
Japanese Office Action mailed Mar. 13, 2012 for corresponding Japanese Application No. 2008-550017, with Partial English-language Translation.
Partial English-language Translation of JP-2000-132413-A.
Partial English-language Translation of JP-2001-5744-A.

* cited by examiner

Primary Examiner — Reginald Bragdon
Assistant Examiner — Baboucarr Faal
(74) Attorney, Agent, or Firm — Fujitsu Patent Center

(57) ABSTRACT

A path controller controls a plurality of paths, including switching between those paths in response to an error notice. Upon detection of a path connection timeout at the path controller, a target driver submits an I/O abort request to a disk array device. The target driver also forwards an error notice to the path controller when it is received. A Fiber Channel driver controls a Fiber Channel adapter. In response to an I/O abort request submitted by the target driver, the Fiber Channel driver blocks every operation on the disk array device, as well as sending an error notice to the target driver.

9 Claims, 29 Drawing Sheets

PROGRAM, METHOD, AND DEVICE FOR COMMUNICATION PROCESSING

CROSS-REFERENCE TO RELATED APPLICATIONS

This application is a continuing application, filed under 35 U.S.C. §111(a), of International Application PCT/JP2006/325429, filed Dec. 20, 2006.

FIELD

The embodiments discussed herein are related to a program, method, and device for communication processing.

BACKGROUND

Generally, server systems use redundant links for more reliable network operation to communicate with a disk array device. A redundant path will replace a working connection path in the event of its failure, not to disrupt the ongoing communication (see, for example, Japanese Laid-Open Patent Publication No. 6-110800).

Fibre Channel is known as one of the data transfer techniques used to connect servers with disk array devices, particularly suitable for performance-oriented server systems. Fibre Channel uses optical fiber cables or coaxial cables capable of transporting signals at up to 200 megabytes per second, so as to realize high-speed data transfer over a maximum distance of 10 kilometers.

FIG. 27 illustrates a typical structure of Fibre Channel connection between a server and a disk array device. Specifically, a server 700 is connected to a disk array device 900 via switches 800a and 800b.

An application 710 may request a disk I/O operation, which involves communication with the disk array device 900. This communication is executed under the control of I/O multipath control software 720 and Fibre Channel drivers 740a and 740b on the server 700. Specifically, the I/O multipath control software 720 controls communication paths between the server 700 and disk array device 900, while the Fibre Channel drivers 740a and 740b control Fibre Channel adapters 730a and 730b that provide physical links with the disk array device 900.

The Fibre Channel drivers 740a and 740b receive an I/O initiation request from their respective upper-level entities, i.e., target drivers 750a and 750b. Responsive to such requests, the Fibre Channel drivers 740a and 740b offer data management (FC-PH layer of Fibre Channel communication) of Exchanges performed for initiating I/O operations on the disk array device 900 over Fibre Channel, as well as management of I/O initiation requests at SCSI level.

The above Fibre Channel system is supposed to detect disruption of a communication path between the server 700 and disk array device 900 and switch the failed path to a redundant path to minimize the communication downtime.

FIG. 28 illustrates a conventional way of processing, depicting only one of the two communication paths.

In the illustrated conventional process, the Fibre Channel driver 740a sends an I/O abort request to the disk array device 900 upon receipt of an I/O abort request (abort) from a target driver 750a, which is positioned above the Fibre Channel driver 740a. The Fibre Channel driver 740a then waits for a response (ACC) to this I/O abort request for some time. There may be no response from the disk array device 900 due to its own failure or some problem in the corresponding connection path. In the case where the response wait period expires for this reason, the Fibre Channel driver 740a sends an I/O error to its upper-level entity. It is not appropriate, however, to perform this error notification immediately upon expiration of the response wait period since a response may experience a transmission line delay. The Fibre Channel driver 740a thus performs management of Exchange records during the wait period including the transmission line delay before returning an I/O error to the upper-level entity. As a result, the conventional process takes much time to switch I/O paths in the event of error, besides requiring a longer wait time for I/O operations initiated by the application 710.

For more quick path switching, the Fibre Channel driver 740a may be configured to perform the following control method.

FIG. 29 illustrates another conventional process.

(1) Upon receipt of an I/O abort request from the target driver 750a, the Fibre Channel driver 740a submits an I/O abort request to the disk array device 900.

(2) The Fibre Channel driver 740a returns an error notice to the target driver 750a as a response to its I/O abort request.

(3) Assuming that the disk array device 900 may not respond, the Fibre Channel driver 740a releases the management memory area that has been allocated for the I/O initiation request since it is no longer necessary.

(4) The Fibre Channel driver 740a waits for the disk array device 900 to return a response (BA_ACC) to the I/O abort request.

(5) If no response is received during the wait period of (4), then the Fibre Channel driver 740a extends the waiting period by the time determined taking into consideration a transmission line delay.

(6) After the time of (5), the Fibre Channel driver 740a releases exchange initiation data (FC-PH layer).

The foregoing method can reduce the time during which the Fibre Channel driver 740a has to manage I/O initiation requests.

However, once I/O is placed on a Fibre Channel link, the identifier (e.g., OX_ID) of Fibre Channel connection used in that I/O has to be maintained even after an I/O abort request is sent to the disk array device 900.

Accordingly, the Fibre Channel driver 740a manages its records of Exchanges (FC-PH layer) throughout the response wait period of an I/O abort request, as well as the wait period derived from transmission line delay, in an attempt to prevent such identifiers from being used improperly. This may, however, result in excessive reservation of identifiers and consequent exhaustion of such resources, which could delay the start of a path switching process.

In addition to the above, the I/O multipath control software 720 may retry an I/O operation of the disk array device 900 repetitively after an abort process is invoked. For example, some failure in a path could produce repetitive operations on the failed portion, resulting in a delay of path switching.

SUMMARY

According to an aspect of the invention, a computer-readable storage medium storing a communication processing program for use in a server including Fibre Channel adapters for multiple-path connection with a disk array device, in which the communication processing program causes a computer to function as: a path controller to control a plurality of paths, including switching therebetween in response to an error notice; a target driver to submit an I/O abort request to the disk array device in response to a timeout of a path connection which is detected by the path controller, and to forward the error notice to the path controller upon receipt thereof; and a Fibre Channel driver to control the Fibre Channel adapter and block all processing operations on the disk array device, as well as sending an error notice to the target driver, in response to an I/O abort request from the target driver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Embodiments of the present invention will now be described in detail below with reference to the accompanying drawings.

The following description begins with an overview of the present invention and then proceeds to specific embodiments of the invention.

Figure 1:
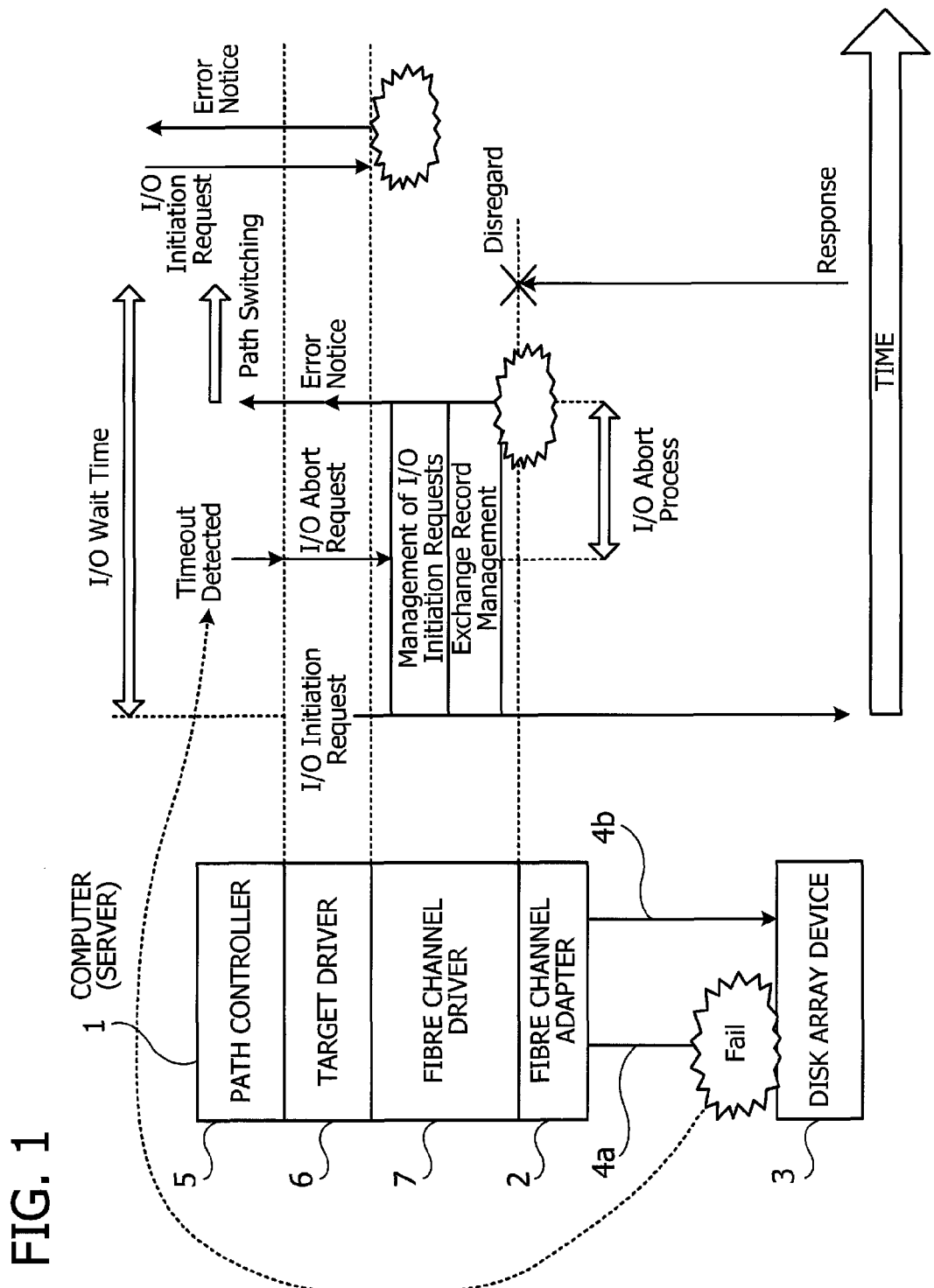
FIG. 1 gives an overview of the present invention.

FIG. 1 gives an overview of the present invention.

The computer 1 illustrated in FIG. 1 includes a Fibre Channel adapter 2 to provide Fibre Channel connections. This Fibre Channel adapter 2 permits the computer 1 to link with a disk array device 3 via a plurality of paths 4a and 4b.

In addition to this Fibre Channel adapter 2, the computer 1 includes a path controller 5, a target driver 6, and a Fibre Channel driver 7.

The path controller 5 controls a plurality of paths 4a and 4b, including switching therebetween in response to an error notice. Specifically, in the case where the path 4a has been used to communicate with the disk array device 3, the path controller 5 switches the data transfer path to the other path 4b in response to an error notice. In the case where the path 4b has been used to communicate with the disk array device 3, the path controller 5 switches the data transfer path to the other path 4a in response to an error notice.

The path controller 5 detects a timeout of a path connection, which causes the target driver 6 to submit an I/O abort request to the disk array device 3. Such a path connection timeout may be detected when, for example, the disk array device 3 has some problem in itself. Another case is when the current data transmission path 4a or 4b encounters a failure. The target driver 6 may also receive an error notice. In this case, the target driver 6 forwards the received error notice to the path controller 5.

The Fibre Channel driver 7 controls the Fibre Channel adapter 2. Its primary functions are initiation management of Exchange (Exc) and management of I/O initiation data. Responsive to an I/O abort request from the target driver 6, the Fibre Channel driver 7 blocks every processing operation on the disk array device 3 and sends an error notice back to the target driver 6. Because of this blocking of I/O operations, the Fibre Channel driver 7 returns an error notice to new I/O initiation requests from the upper layer, besides disregarding responses from the disk array device 3.

In operation of the above-described communication processing program, the target driver 6 submits an I/O abort request to the disk array device 3 in response to a path connection timeout detected by the path controller 5. This I/O abort request from the target driver 6 causes the Fibre Channel driver 7 to block every processing operation on the disk array device 3 and send an error notice back to the target driver 6. The target driver 6 then supplies the received error notice to the path controller 5. Upon receipt of this error notice, the path controller 5 executes path switching. The I/O wait time of the computer 1 is reduced accordingly.

The following will describe several embodiments of the present invention.

Figure 2:
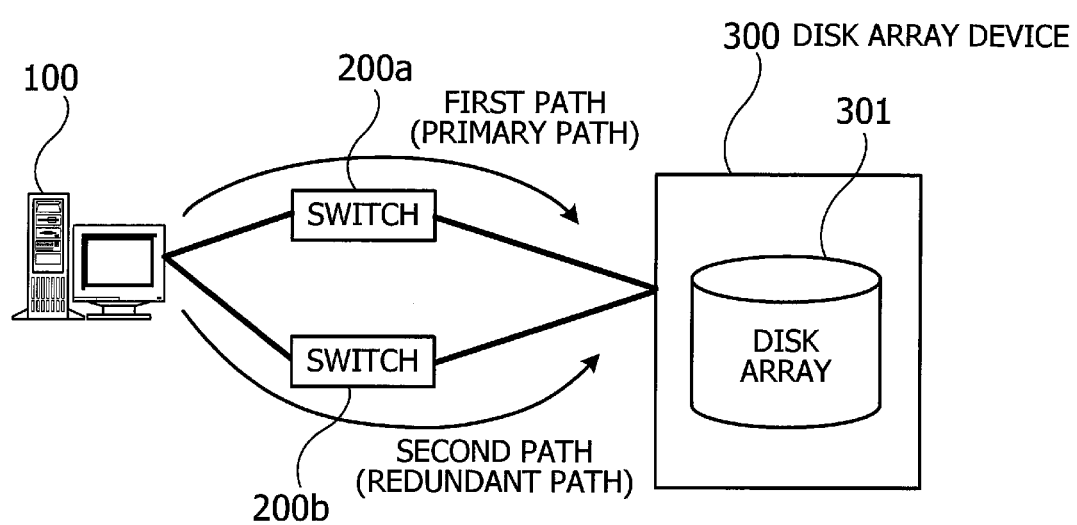
FIG. 2 is a block diagram illustrating a communication processing system according to an embodiment.

FIG. 2 is a block diagram illustrating a communication processing system according to an embodiment.

The communication processing system illustrated in FIG. 2 includes a server (communication processing device) 100 and a disk array device 300, which are interconnected via Fibre Channel switches (simply, "switches") 200a and 200b. The disk array device 300 includes one or more disk arrays (e.g., disk array 301 in FIG. 2) to store data received from the server 100.

One transmission path runs from the server 100 to the disk array device 300 via one switch 200a, which is referred to as a first path (primary path). Another path runs from the server 100 to the disk array device 300 via the other switch 200b, which is referred to as a second path (redundant path). In the event of a failure in one of these paths, the server 100 switches it to the other path to keep the system operating.

Figure 3:
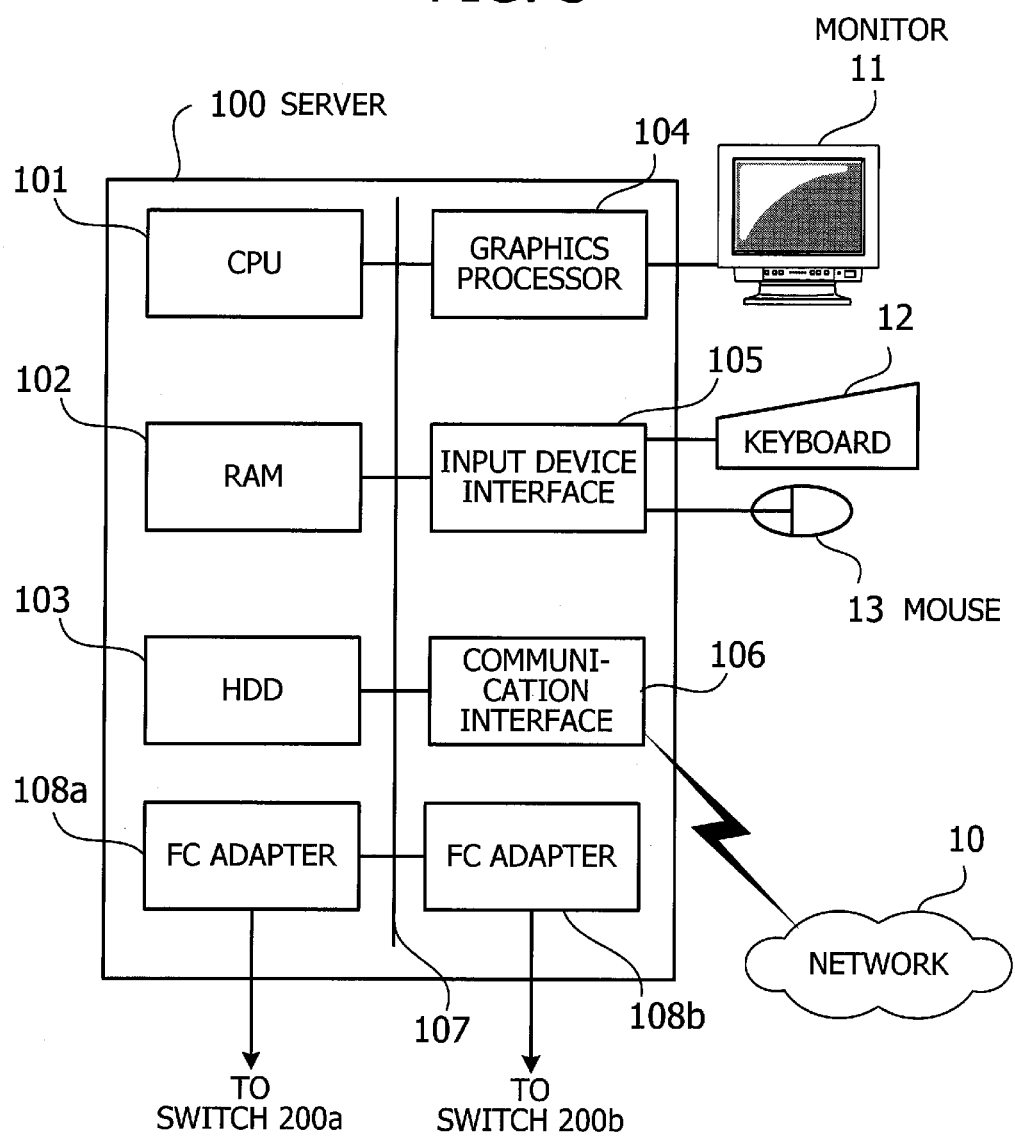
FIG. 3 illustrates an example hardware configuration of a server.

FIG. 3 illustrates an example hardware configuration of a server.

This server 100 includes a central processing unit (CPU) 101 to control the entire device functions. Connected to this CPU 101 via a bus 107 are: a random access memory (RAM) 102, a hard disk drive (HDD) 103, a graphics processor 104, an input device interface 105, a communication interface 106, and Fibre Channel (FC) adapters 108a and 108b.

The RAM 102 serves as temporary storage for the whole or part of operating system (OS) programs and application programs that the CPU 101 executes, in addition to other various data objects manipulated at runtime. The HDD 103 stores program files and data files of the operating system and applications.

The graphics processor 104 is coupled to a monitor 11. The graphics processor 104 produces video images in accordance with instructions from the CPU 101 and displays them on the screen of the monitor 11. The input device interface 105 is used to receive signals from a keyboard 12 and a mouse 13. Those input signals are supplied to the CPU 101 via the bus 107.

The communication interface 106 is connected to a network 10, allowing the CPU 101 to exchange data with other computers on the network 10.

The FC adapters 108a and 108b are where the signal transmission cables from switches 200a and 200b are terminated.

The hardware described above serves as a platform for realizing the processing functions of the present embodiment.

For the purpose of communication processing in a system with the above-described hardware structure, the server 100 and disk array device 300 include various functions described below.

Figure 4:
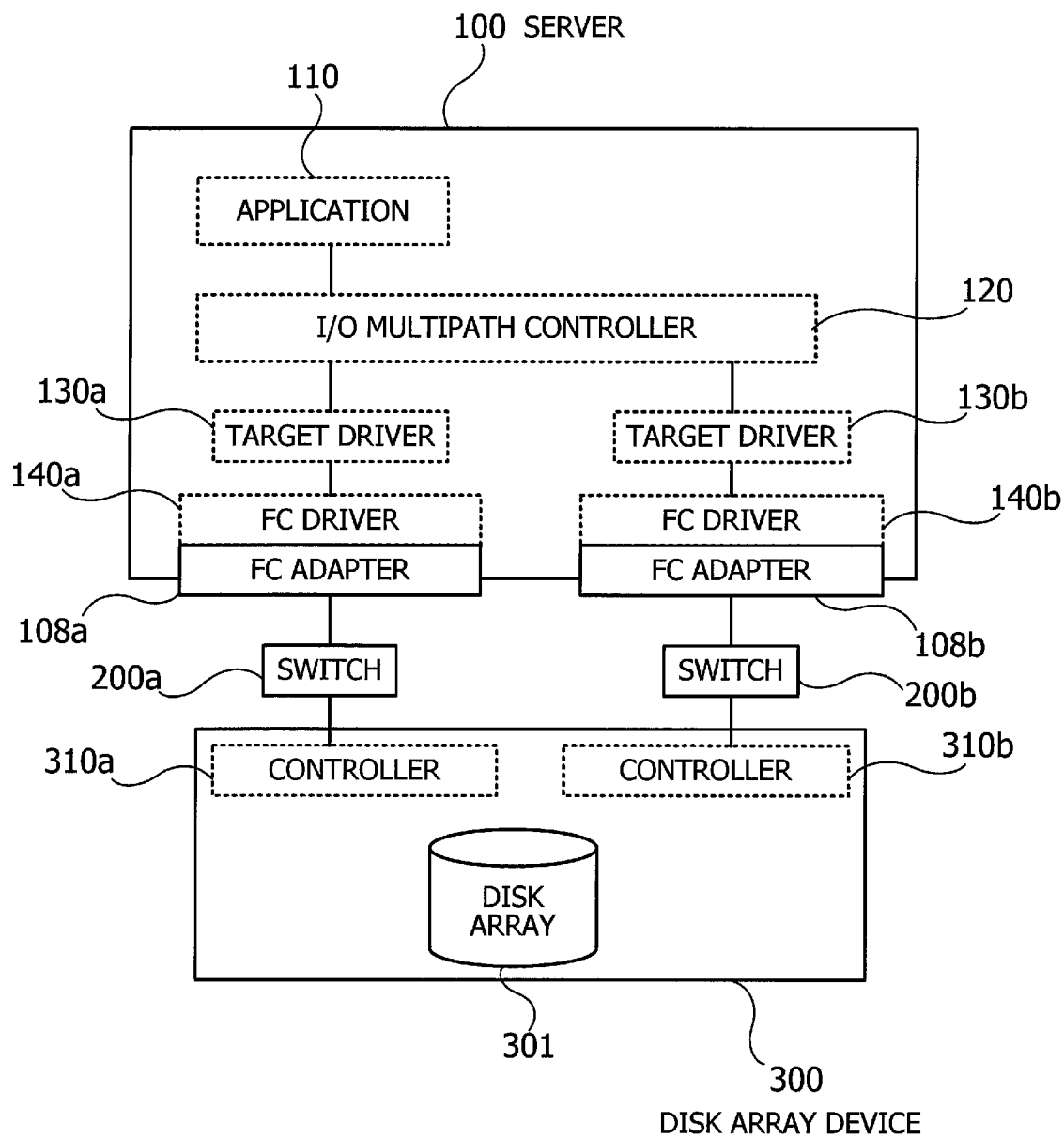
FIG. 4 is a block diagram illustrating functions of a server and a disk array device.
Figure 5:
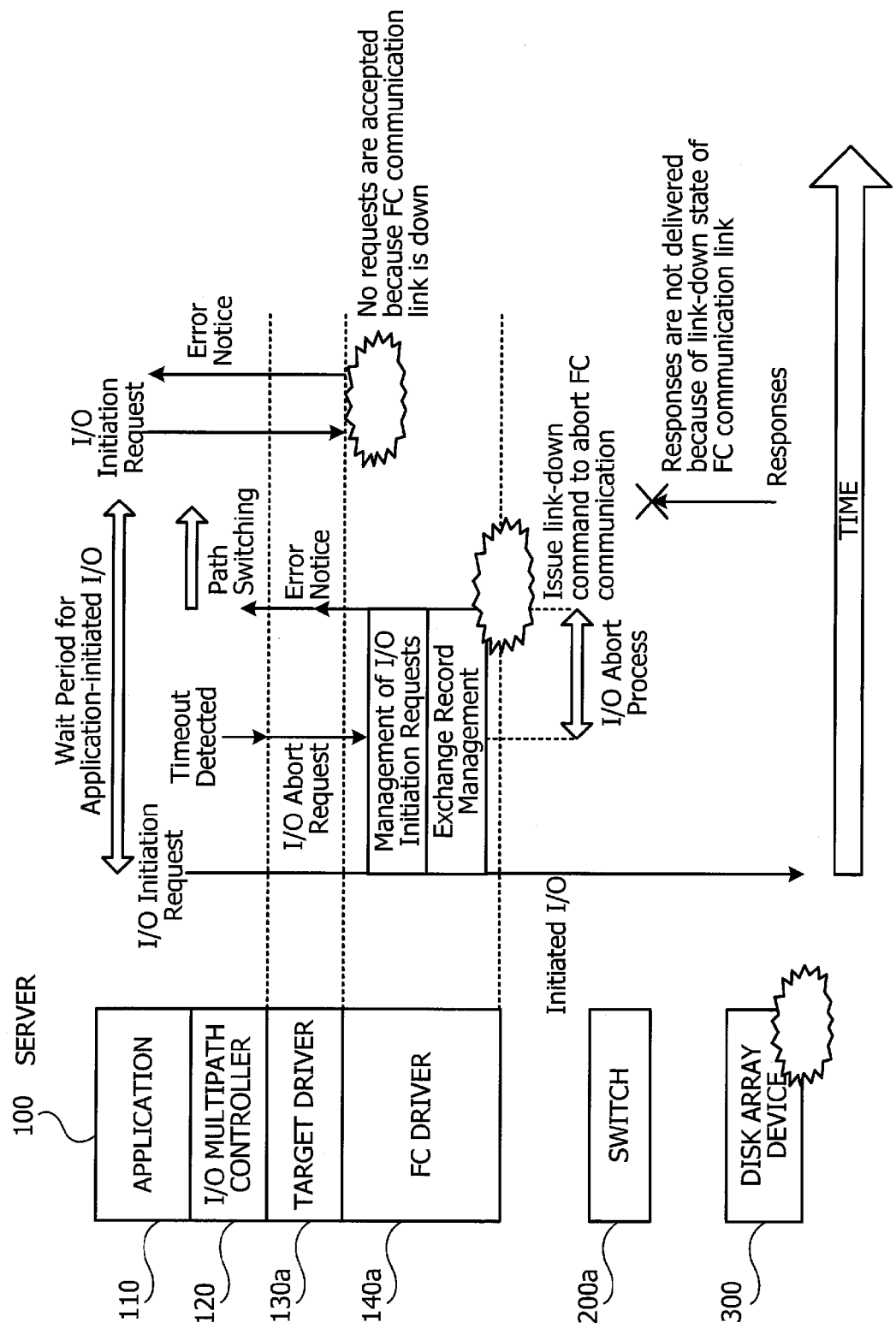
FIG. 5 explains what an FC driver performs.

FIG. 4 is a block diagram illustrating functions provided in the server and disk array device, and FIG. 5 explains what the FC driver performs. In FIG. 4, the dotted boxes indicate functional blocks.

The server 100 includes an application 110, an I/O multipath controller 120, target drivers 130a and 130b, and Fibre Channel (FC) drivers 140a and 140b.

The application 110 is, for example, a user application, which produces I/O initiation requests, i.e., the requests for communication control related to input and output access to the disk array 301.

The I/O multipath controller 120 controls communication paths between the server 100 and disk array device 300. Specifically, the I/O multipath controller 120 watches the condition of each connection path between the server 100 and disk array device 300, so as to choose an appropriate path for delivering I/O initiation requests from the application 110. Those I/O initiation requests go to lower layer entities that actually manage the connection of each path. The I/O multipath controller 120 recognizes anomalies of a path by determining whether an error notice is returned in response to those I/O initiation requests.

The target drivers 130a and 130b issue and manage their respective I/O processing requests addressed to the disk array 301.

The FC drivers 140a and 140b provide, among other things, the functions of managing I/O initiation requests and records of initiated Exchanges. The FC drivers 140a and 140b control their corresponding FC adapters 108a and 108b, which actually executes a communication process to interact with the disk array device 300 upon receipt of I/O initiation requests. This communication process takes place in the following way.

The FC drivers 140a and 140b internally produce an Exchange ID (X_ID) to identify each operation made up of a series of Sequences that take place at an individual adapter port. This "operation" is called an "Exchange," which is identified by OX_ID (X_ID for transmission) and RX_ID (X_ID for reception).

The FC drivers 140a and 140b place I/O (command, address, etc.) on an FC transmission line, using the produced X_ID as OX_ID. Upon receipt of OX_ID, the disk array device 300 responds by using its own X_ID (RX_ID) thus permitting the FC drivers 140a and 140b to use the received RX_ID in new I/O operations initiated thereafter. That is, each Exchange is managed based on the combination of OX_ID and RX_ID.

X_ID (OX_ID and RX_ID) is freed upon completion of the Exchange, or upon expiration of a predetermined time (10 seconds according to the FC standard) after an I/O abort request (abort) is issued. Violation of this rule means duplicate allocation of X_ID in use, in the event of which the Exchange may not be executed correctly on the part of the disk array device 300.

The disk array device 300 includes controllers 310a and 310b to control a disk array 301 in accordance with I/O issued by the server 100. One controller 310a corresponds to the primary path, the other controller 310b to the redundant path. The disk array device 300 receives an issued I/O via those controllers 310a and 310b and returns resulting data to the server 100.

The FC drivers 140a and 140b in the above-described server 100 handle an I/O abort request from their corresponding target drivers 130a and 130b as follows.

Figure 6:
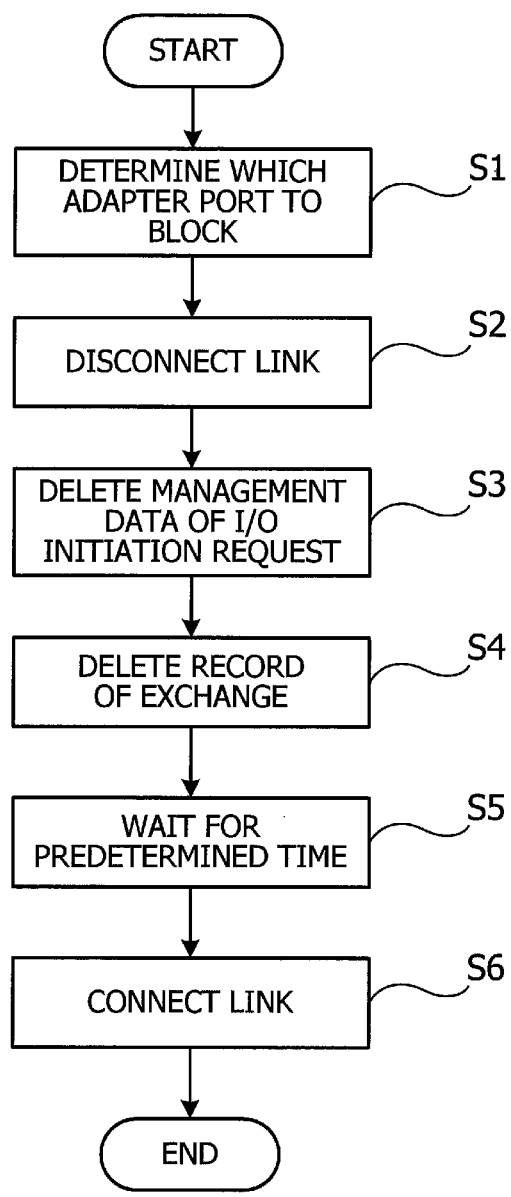
FIG. 6 is a flowchart illustrating a switching process executed by the FC driver.

Suppose, for illustration, that the FC driver 140a has received an I/O abort request from an upper-layer entity. Referring to FIGS. 5 and 6, the following will describe how this FC driver 140a performs switching from primary path to redundant path.

FIG. 6 is a flowchart illustrating a switching process executed by the FC driver.

When an abort request is received, the FC driver 140a determines which adapter port to block (abort), among those of the FC adapter 108a (step S1). This selection of adapter ports may differ from request to request.

(1) In the case where the abort request is directed to a specific I/O, the adapter port specified in that I/O is selected for blocking. (2) In the case where the abort request is directed to a specific disk array device 300, the adapter port specified in that I/O is selected for blocking. (3) In the case where the abort request is directed to a specific disk array (target) 301, the adapter port specified in that I/O is selected for blocking.

The FC driver 140a then sends a LINK DOWN command to the adapter port selected for blocking, thereby disconnecting its link to the Fibre Channel transmission line to abort the Fibre Channel communication (step S2).

Subsequently, the FC driver 140a returns an error to the target driver 130a unconditionally for every I/O, both issued and to be issued, of the selected adapter port, as well as deleting management data (SCSI level) of their corresponding I/O initiation requests (step S3). This triggers the I/O multipath controller 120 to start path switching.

The FC driver 140a then deletes records of Exchange (FC-PH layer) for the Fibre Channel communication related to the I/O for which it has responded to the target driver 130a (step S4).

The FC driver 140a waits for a predetermined time by activating a timer, taking into consideration a path switching time that the I/O multipath controller 120 may take (step S5). This wait time may be a fixed time of, for example, 60 to 180 seconds. Or it may be released by a manual command. During the period when this timer is active, the target driver 130a may issue a new I/O initiation request addressed to the adapter ports that the FC driver 140a is managing. The FC driver 140a rejects such an I/O initiation request, if received, by immediately sending an error back to its originator (hence "blocking"). Since the FC communication link has been in a link-down state, no responses are delivered as to the adapter port to which the FC driver 140a has initiated I/O.

Upon expiration of the timer, the FC driver 140a executes a LINK UP process for the adapter port to terminate its blocking state, thus connecting a link (step S6).

Because every response from the disk array device 300 is discarded, there is no need for managing records of Exchanges (FC-PH layer) initiated for Fibre Channel communication. Accordingly, the FC driver 140a deletes such Exchange records immediately. This further eliminates the need for managing I/O initiation requests from the target driver 130a at SCSI level, thus making it possible for the FC driver 140a to return an error immediately. The I/O multipath controller 120 can therefore start path switching promptly, which results in a reduced wait time of I/O operations initiated by the application 110.

The I/O multipath controller 120 or target driver 130a above the FC driver 140a may retry I/O operations. The FC driver 140a immediately responds to those retries by sending an error notice since the communication with the disk array device 300 has been shut down. This feature avoids futile retries.

The following will describe in detail what the FC driver 140a (or 140b) performs.

Figure 7:
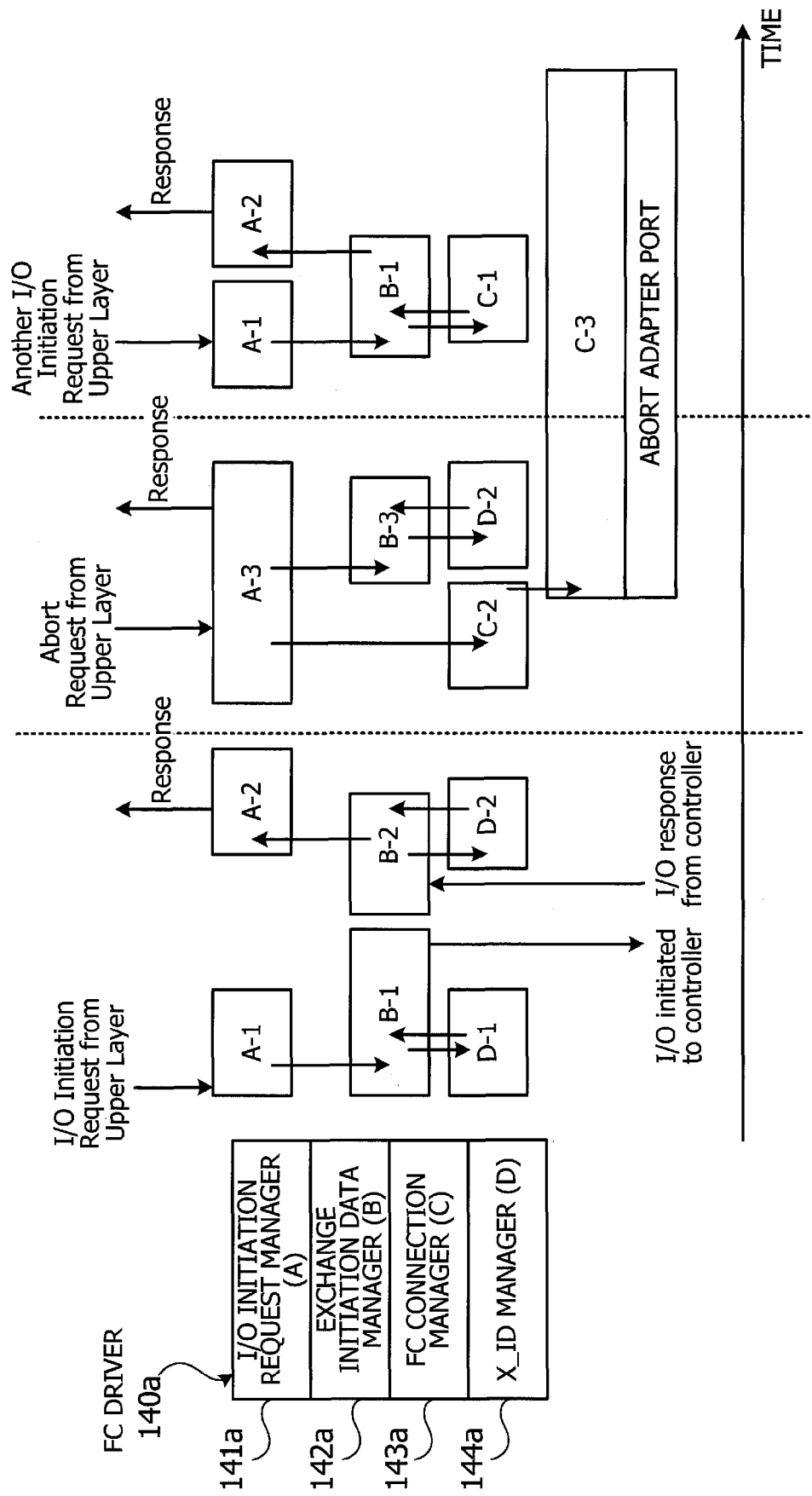
FIG. 7 is a sequence diagram illustrating what the FC driver performs.

FIG. 7 is a sequence diagram illustrating what the FC driver performs.

The FC driver 140a includes an I/O initiation request manager 141a, an exchange initiation data manager 142a, an FC connection manager 143a, and an X_ID manager 144a.

Upon receipt of an I/O initiation request from the target driver 130a, the I/O initiation request manager 141a asks other blocks of the FC driver 140a to execute their specific tasks to handle that request. The I/O initiation request manager 141a then returns a response to the target driver 130a as necessary. The I/O initiation request manager 141a is also responsible for management of timers (described later).

When an I/O initiation request is received, the exchange initiation data manager 142a attempts to connect with a controller 310a to initiate an I/O operation.

The FC connection manager 143a has a connectable target list to manage the state of connection with the controller 310a (i.e., whether the controller 310a can be reached).

The X_ID manager 144a has an X_ID management table to manage X_IDs.

Figure 8:
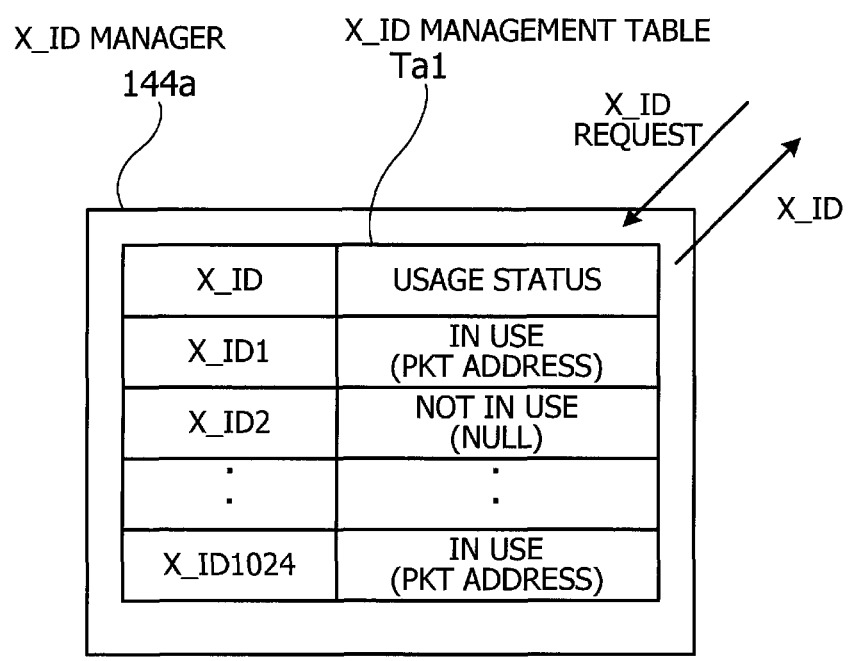
FIG. 8 illustrates an X_ID management table.

FIG. 8 illustrates an X_ID management table.

This X_ID management table Ta1 has data fields titled "X_ID" and "Usage Status." Values of these data fields on each row are associated with each other.

X_ID field contains a unique X_ID (e.g., X_ID1, X_ID2, . . . ). The number of those X_IDs may vary depending on the implementation.

Usage Status field indicates whether the corresponding X_ID is being used. Specifically, this field contains a specific PKT address for X_ID in use and NULL for X_ID not in use.

The description now refers back to FIG. 7.

FIG. 7 illustrates how the above-noted blocks exchange data with each other, each particular process being identified by a symbol and numeral. Those processes may be executed sequentially.

The FC driver 140a receives the following requests from the target driver 130a (also referred to as "upper layer"): (α) I/O initiation request from upper layer, (β) I/O abort request from upper layer, (γ) another I/O initiation request from upper layer. The FC driver 140a invokes different processes for those different requests.

Request (α), which precedes request (β), causes the server 100 to initiate an I/O operation to the disk array device 300. Request (β) may be followed by request (γ), in which case the FC driver 140a handles it in a different way from the case of request (α).

Specifically, the I/O initiation request manager 141a executes different processes (A-1 to A-3) for different requests. The exchange initiation data manager 142a executes different processes (B-1 to B-3) for different requests. The, FC connection manager 143a executes different processes (C-1 to C-3) for different requests. The X_ID manager 144a executes different processes (D-1 to D-2) for different requests.

The arrows in FIG. 7 indicate interactions between the blocks. For example, process B-1 is invoked as a result of process A-1. The following will describe how each block operates in response to a request from the upper layer.

(α) Handling I/O Initiation Request from Upper Layer

To handle this request, the I/O initiation request manager 141a executes process A-1, the exchange initiation data manager 142a executes process B-1, and the X_ID manager 144a executes process D-1 as depicted in FIG. 7. As a result of these processes, I/O is initiated to the controller 310a. When an I/O response is received from the controller 310a, the exchange initiation data manager 142a executes process B-2, the I/O initiation request manager 141a executes process A-2, and the X_ID manager 144a executes process D-2, thereby returning a response to the upper layer.

<Process A-1>

Figure 9:
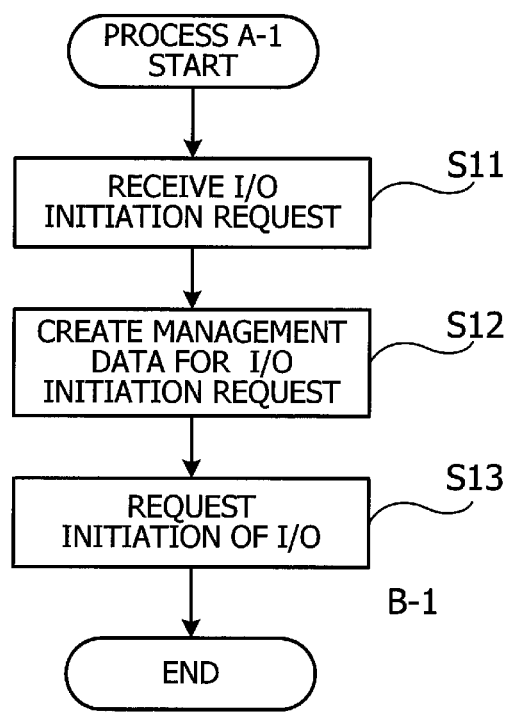
FIG. 9 is a flowchart of process A-1.

FIG. 9 is a flowchart of process A-1. In FIGS. 9 to 19, as well as in FIGS. 23 to 26, the name of a process (e.g., "B-1" in FIG. 9) may be placed beside a step to indicate what process will be invoked by that step.

Upon receipt of an I/O initiation request from the target driver 130a (step S11), the I/O initiation request manager 141a creates management data for that I/O initiation request (step S12).

The I/O initiation request manager 141a then requests the exchange initiation data manager 142a to initiate an I/O operation (step S13), thus ending process A-1 while invoking process B-1.

<Process B-1>

Figure 10:
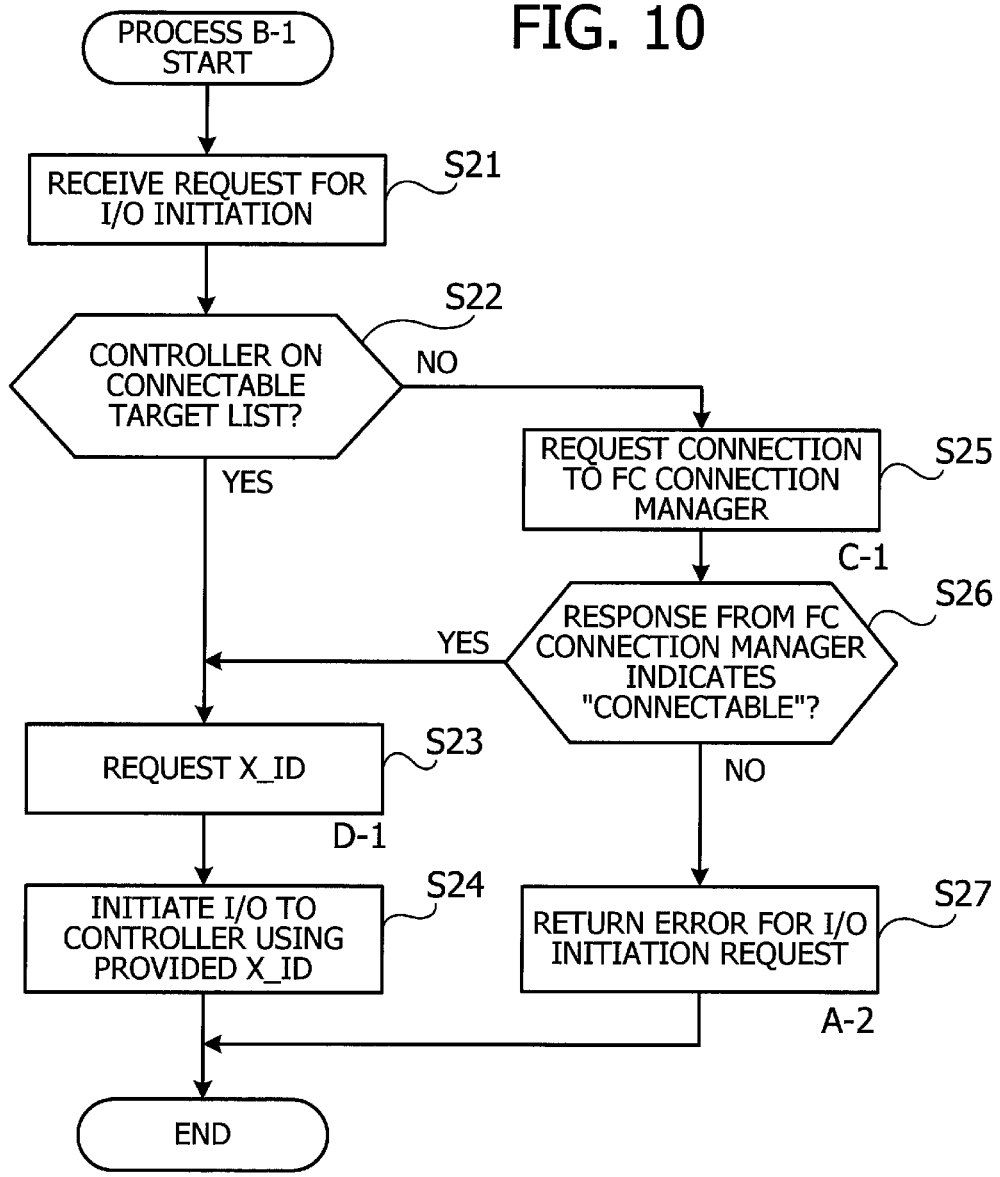
FIG. 10 is a flowchart of process B-1.

FIG. 10 is a flowchart of process B-1.

Upon request for I/O initiation from the I/O initiation request manager 141a (step S21), the exchange initiation data manager 142a determines whether the controller 310a (or the device to which I/O will be issued) is on a connectable target list (step S22).

If the controller 310a is on the connectable target list (Yes at step S22), the exchange initiation data manager 142a then requests the X_ID manager 144a to provide X_ID (step S23), thus invoking process D-1.

Subsequently, the exchange initiation data manager 142a initiates I/O to the controller 310a by using provided X_ID (step S24), thus ending the process B-1.

If the controller 310a is not on the connectable target list (No at step S22), the exchange initiation data manager 142a requests the FC connection manager 143a to establish a connection with the controller 310a (step S25) thus invoking process C-1. The exchange initiation data manager 142a then receives a response from the FC connection manager 143a and determines whether the response indicates that the controller 310a is "connectable" (step S26).

If the response from the FC connection manager 143a indicates that the controller 310a is "connectable" (Yes at step S26) then the exchange initiation data manager 142a moves to step S23 to execute the foregoing steps.

If the response from the FC connection manager 143a indicates that the controller 310a is "not connectable" (No at step S26), then the exchange initiation data manager 142*a* returns an error response to the request for I/O initiation that the I/O initiation request manager 141*a* has made (step S27), thus ending the process B-1.

<Process D-1>

Figure 11:
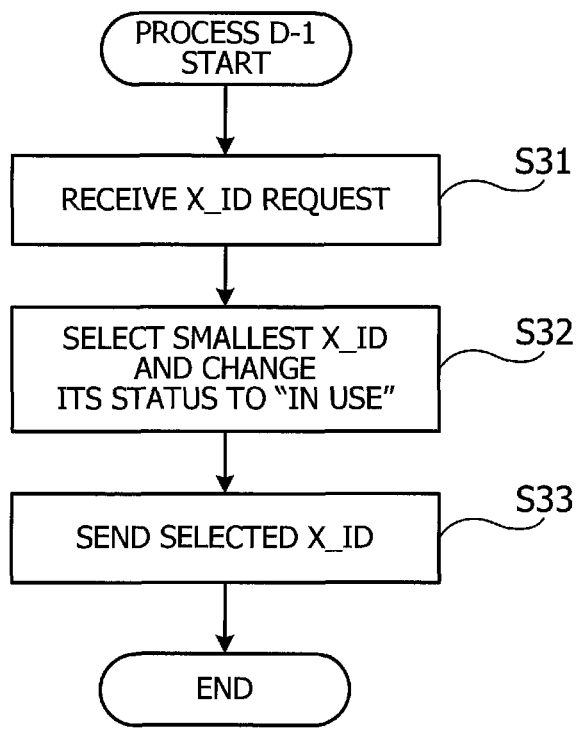
FIG. 11 is a flowchart of process D-1.

FIG. 11 is a flowchart of process D-1.

Upon receipt of an X_ID request (step S31), the X_ID manager 144*a* consults the X_ID management table Ta1 to select a smallest unused X_ID and changes its status to "in use" (step S32).

The X_ID manager 144*a* then sends the selected X_ID to the exchange initiation data manager 142*a* (step S33) thus ending the process D-1.

<Process B-2>

Figure 12:
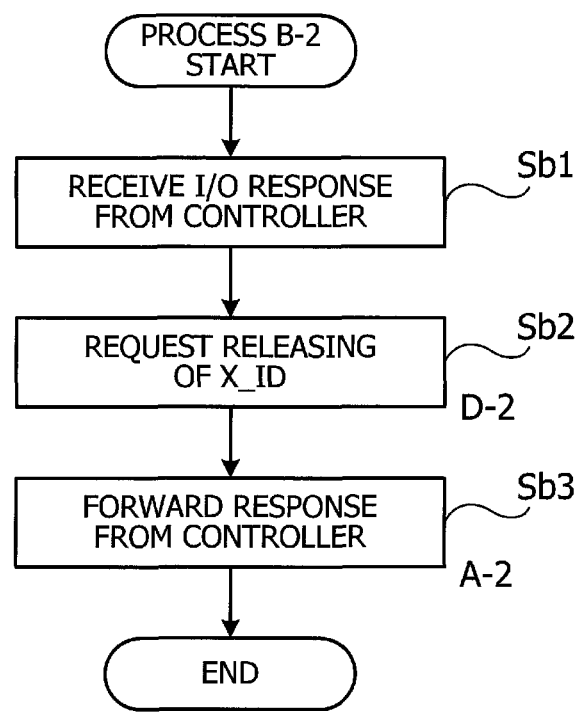
FIG. 12 is a flowchart of process B-2.

FIG. 12 is a flowchart of process B-2.

Upon receipt of an I/O response from the controller 310*a* (step Sb1), the exchange initiation data manager 142*a* asks the X_ID manager 144*a* to release X_ID (step Sb2), thus invoking process D-2.

The exchange initiation data manager 142*a* then forwards the I/O response from the controller 310*a* to the I/O initiation request manager 141*a* (step Sb3), thus invoking process A-2.

<Process D-2>

Figure 13:
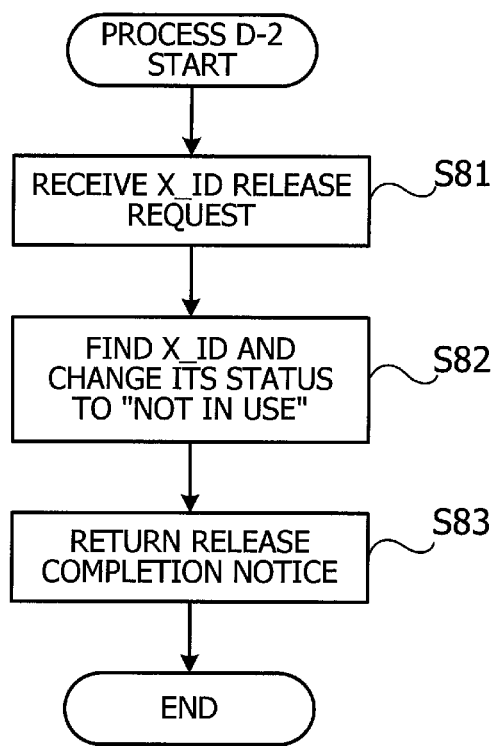
FIG. 13 is a flowchart of process D-2.

FIG. 13 is a flowchart of process D-2.

Upon receipt of an X_ID release request (step S81), the X_ID manager 144*a* searches its X_ID management table Ta1 to find the received X_ID (i.e., X_ID specified to be released) and changes its status to "not in use" (step S82).

Subsequently, the X_ID manager 144*a* returns a release completion notice to the exchange initiation data manager 142*a* (step S83), thus ending the process D-2.

<Process A-2>

Figure 14:
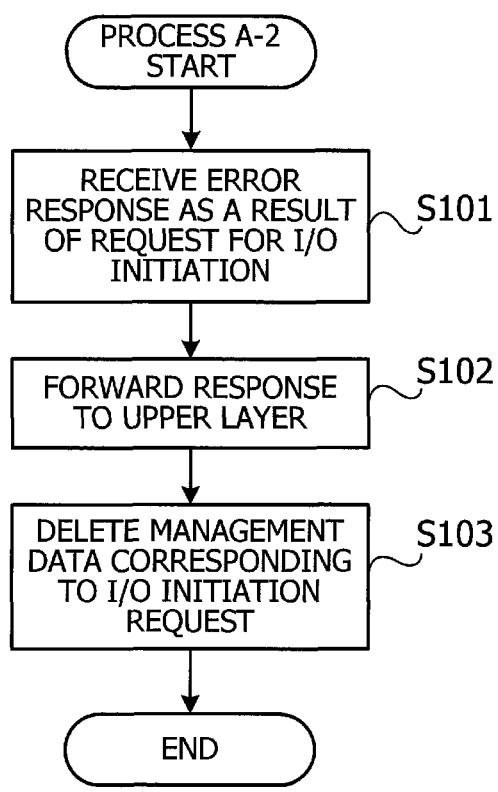
FIG. 14 is a flowchart of process A-2.

FIG. 14 is a flowchart of process A-2.

Upon receipt of an error response from the exchange initiation data manager 142*a* as a result of the request for I/O initiation (step S101), the I/O initiation request manager 141*a* forwards that response from the exchange initiation data manager 142*a* to the upper layer (step S102).

The I/O initiation request manager 141*a* then deletes management data of the I/O initiation request (step S103), thus ending the process A-2.

(β) Handling I/O Abort Request from Upper Layer

To handle this request, the I/O initiation request manager 141*a* executes process A-3, and the FC connection manager 143*a* executes processes C-2 and C-3 as depicted in FIG. 7. As a result of these processes, the specified adapter port is blocked for a certain time. In addition to the above, the exchange initiation data manager 142*a* executes process B-3, and the X_ID manager 144*a* executes process D-2, as a consequence of process A-3.

<Process A-3>

Figure 15:
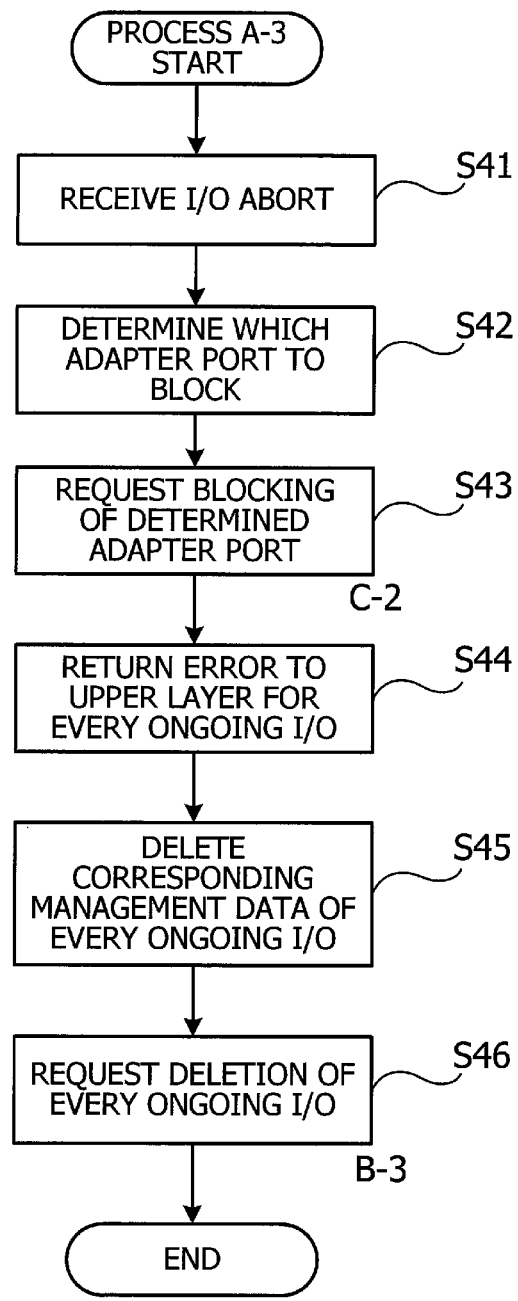
FIG. 15 is a flowchart of process A-3.

FIG. 15 is a flowchart of process A-3.

Upon receipt of an I/O abort from the upper layer (step S41), the I/O initiation request manager 141*a* determines which adapter port of an FC adapter 108*a* to block (step S42).

The I/O initiation request manager 141*a* then requests the FC connection manager 143*a* to block the determined adapter port (step S43), thus invoking process C-2.

Subsequently, the I/O initiation request manager 141*a* returns an error response to the upper layer for every ongoing I/O initiated through the determined adapter port (step S44).

The I/O initiation request manager 141*a* further deletes management data of I/O initiation requests, for every ongoing I/O initiated through the determined adapter port (step S45).

The I/O initiation request manager 141*a* then requests the exchange initiation data manager 142*a* to delete every ongoing I/O initiated through the determined adapter port (step S46), thus invoking process B-3 while concluding process A-3.

<Process C-2>

Figure 16:
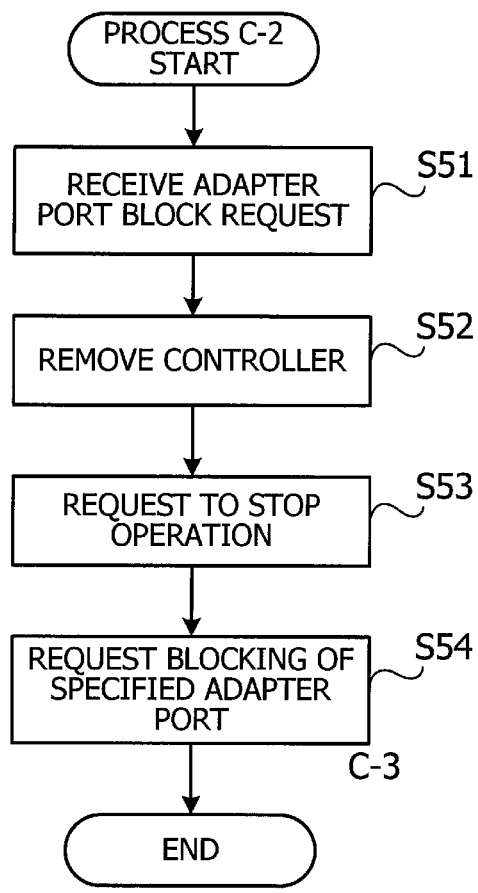
FIG. 16 is a flowchart of process C-2.

FIG. 16 is a flowchart of process C-2.

Upon receipt of a block request for a specific adapter port (step S51), the FC connection manager 143*a* updates its connectable target list by removing therefrom the controller 310*a* that has been connected through the specified adapter port (step S52). While the present embodiment assumes that a single controller 310*a* is involved, the FC connection manager 143*a* may delete two or more such list entries in the case where a plurality of controllers are connected through the specified adapter port.

The FC connection manager 143*a* then commands the FC adapter 108*a* (or its chip) to stop its operation (step S53).

Subsequently, the FC connection manager 143*a* requests itself to block the determined adapter port (step S54), thus invoking process C-3. This concludes the process C-2.

<Process C-3>

Figure 17:
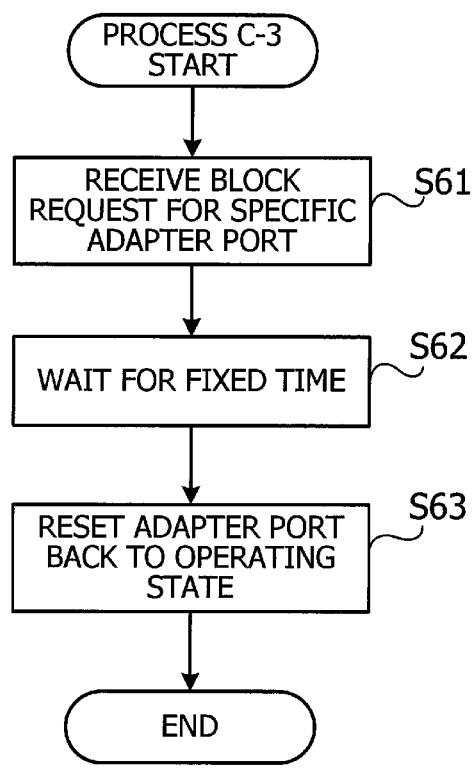
FIG. 17 is a flowchart of process C-3.

FIG. 17 is a flowchart of process C-3.

Upon receipt of a block request for a specific adapter port (step S61), the FC connection manager 143*a* waits for a fixed time (step S62), stopping the operation of the adapter port. This wait time may be, but not limited to, about 180 seconds.

The FC connection manager 143*a* resets the FC adapter 108*a* (or its chip) to bring the adapter port back into an operating state (step S63), thus ending the process C-3.

<Process B-3>

Figure 18:
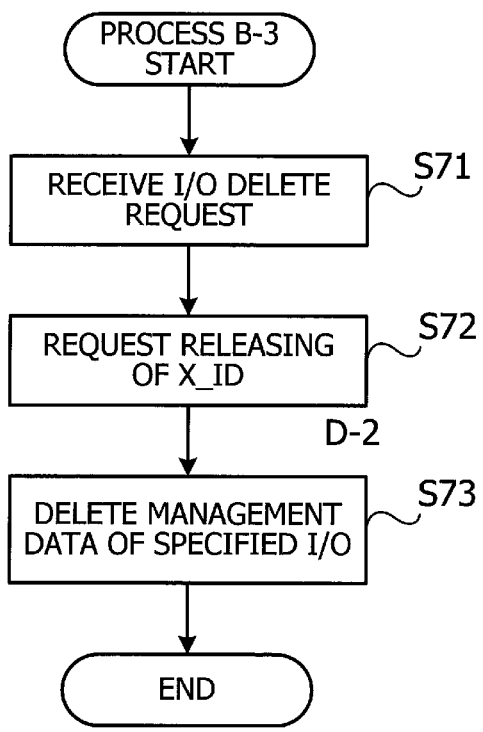
FIG. 18 is a flowchart of process B-3.

FIG. 18 is a flowchart of process B-3.

Upon receipt of an I/O delete request from the I/O initiation request manager 141*a* (step S71), the exchange initiation data manager 142*a* requests the X_ID manager 144*a* to release X_ID (step S72), thus invoking process D-2.

The exchange initiation data manager 142*a* deletes management data of the specified I/O (step S73), thus ending the process B-3.

(γ) Handling Another I/O Initiation Request from Upper Layer

To handle this request, the I/O initiation request manager 141*a* executes processes A-1 and A-2, the exchange initiation data manager 142*a* executes process B-1, and the FC connection manager 143*a* executes process C-1 as depicted in FIG. 7. As a result of these processes, an error response is returned to I/O initiation requests if they are directed to the blocked adapter port.

Processes A-1, A-2, and B-1 are executed in the way described earlier.

<Process C-1>

Figure 19:
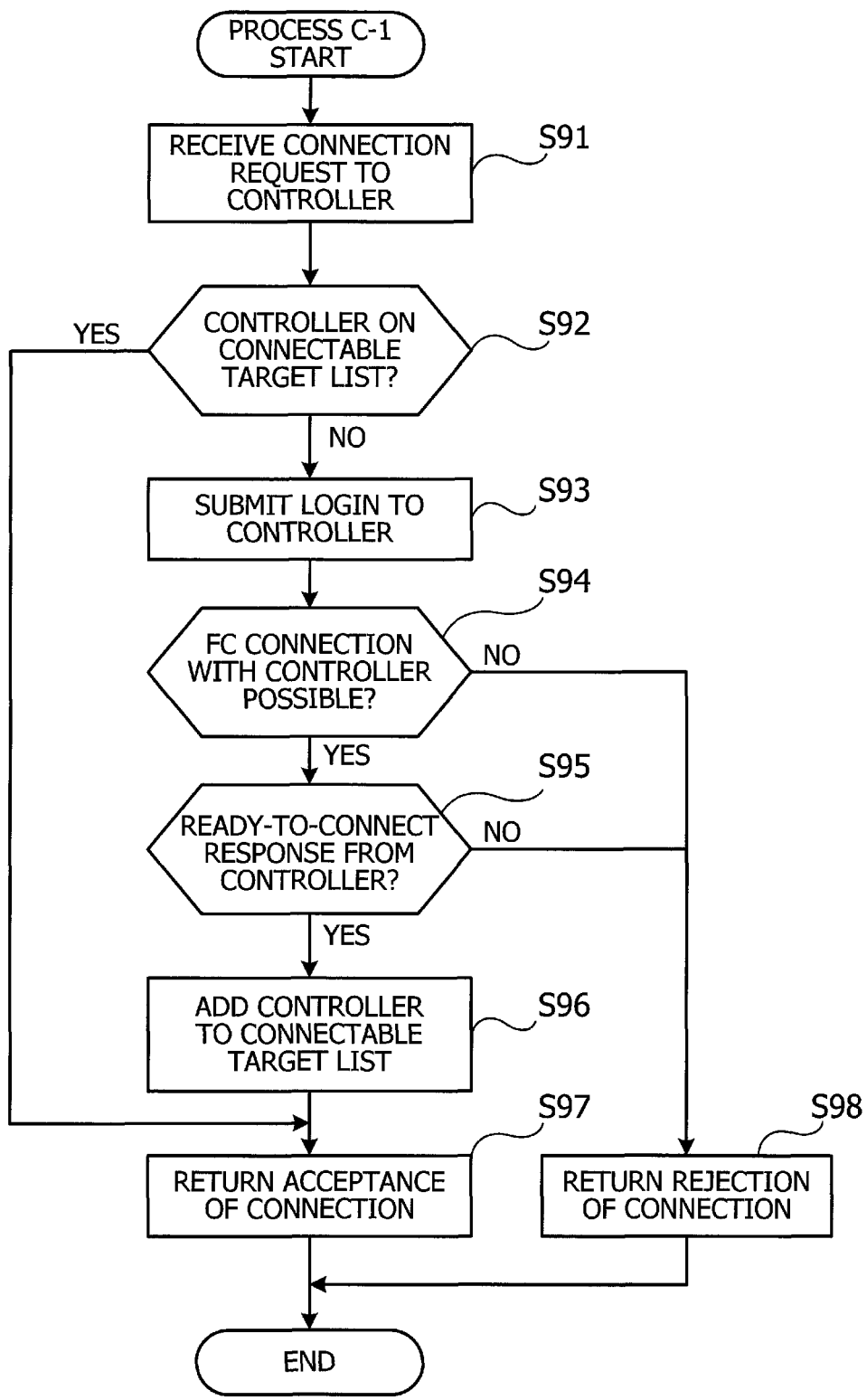
FIG. 19 is a flowchart of process C-1.

FIG. 19 is a flowchart of process C-1.

Upon receipt of a connection request to the controller 310*a* (step S91), the FC connection manager 143*a* determines whether the controller 310*a* is on the connectable target list (step S92).

If the controller 310*a* is on the connectable target list (Yes at step S92), the process skips to step S97 (described later).

If the controller 310*a* is not on the connectable target list (No at step S92), the FC connection manager 143*a* submits LOGIN to the controller 310*a* (step S93).

The FC connection manager 143*a* then determines whether it is possible to establish an FC connection with the controller 310*a* (step S94).

If it is possible to establish an FC connection with the controller 310*a* (Yes at step S94), the FC connection manager 143*a* determines whether the controller 310*a* has returned a response indicating its ready-to-connection status (step S95).

If there is a ready-to-connect response from the controller 310a (Yes at step S95), the FC connection manager 143a adds the controller 310a to the connectable target list (step S96).

The FC connection manager 143a then returns a response indicating acceptance of connection back to the requester (exchange initiation data manager 142a) (step S97), thus ending the process C-1.

If it is not possible to establish an FC connection with the controller 310a (No at step S94), or if there is no ready-to-connect response from the controller 310a even after a predetermined time (No at step S95), then the FC connection manager 143a returns a response indicating rejection of connection back to the requester (exchange initiation data manager 142a) (step S98), thus ending the process C-1.

As can be seen from the above, the present embodiment provides a communication processing system in which the server (communication processing device) 100 brings all I/O operations related to a specific disk array into a blocked state in response to an I/O abort request submitted by the I/O multipath controller 120 as a result of timeout. This makes it possible to return an error notice promptly from the FC drivers 140a and 140b to corresponding target drivers 130a and 130b in their upper layer. Accordingly, the I/O multipath controller 120 can receive an error notice in a short time and quickly retry an I/O initiation request via an alternative path (i.e., redundant path in place of primary path, primary path in place of redundant path) in an attempt to input or output data correctly. This feature enables the application 110 to accomplish its tasks without timeout.

A communication processing system according to a second embodiment will now be described below.

The following description will focus on the difference of the second embodiment from the foregoing first embodiment, not repeating explanations for their common features.

According to the second embodiment, the communication processing system performs blocking on the basis of individual controllers (target) 310a and 310b, unlike the first embodiment, in which the blocking is performed on an adapter port basis with respect to the FC adapters 108a and 108b. The second embodiment is different from the first embodiment in its FC drivers 140a and 140b.

Figure 20:
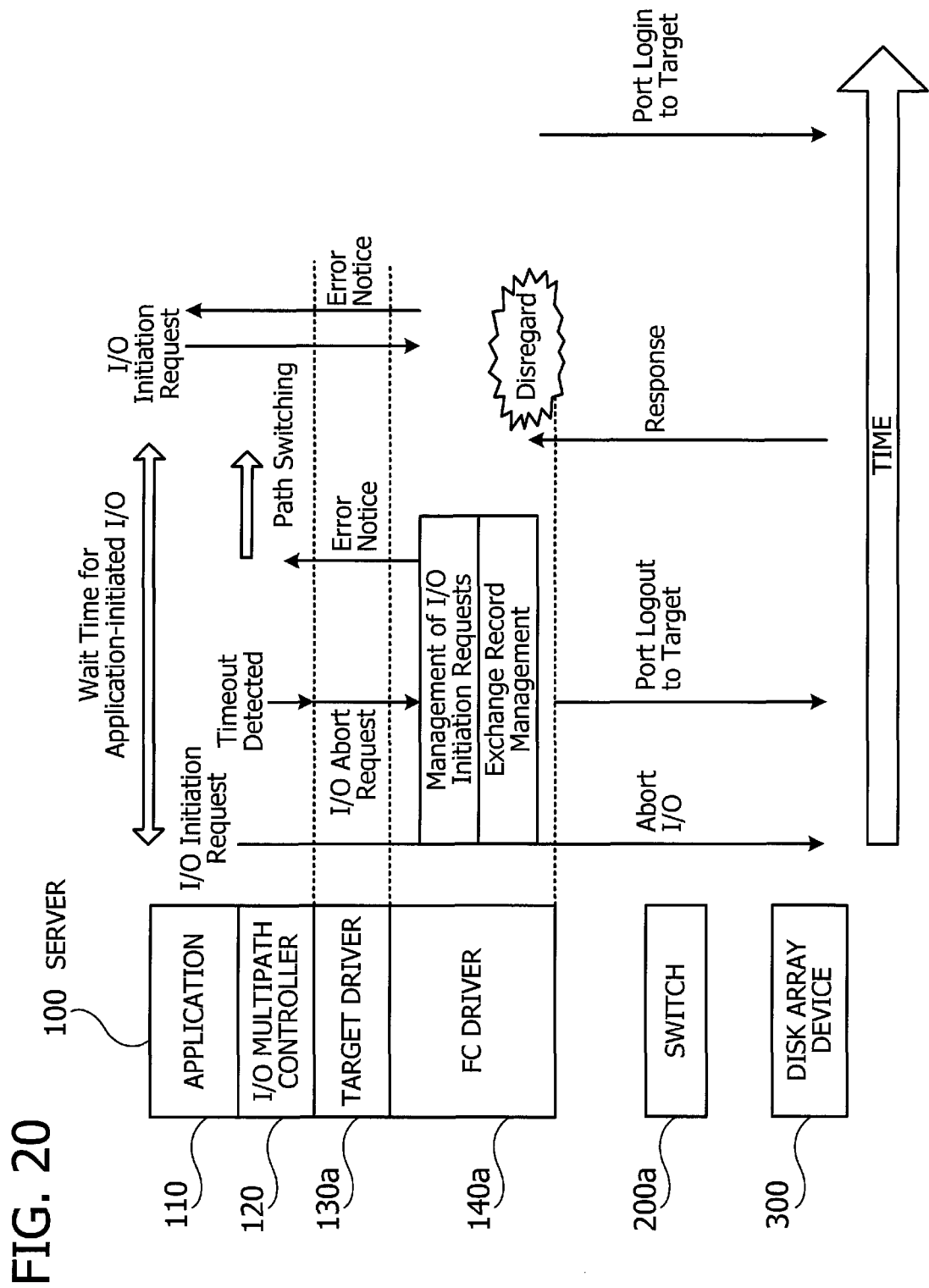
FIG. 20 illustrates what is performed by an FC driver according to a second embodiment.
Figure 21:
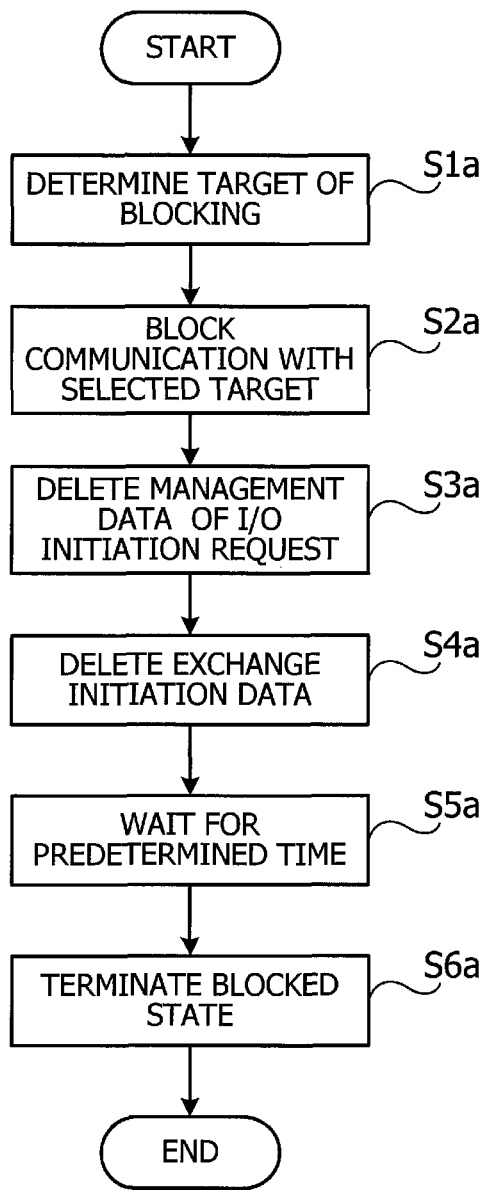
FIG. 21 is a flowchart of a blocking process performed by the FC driver according to the second embodiment.

Referring now to FIGS. 20 and 21, the following will describe a switching process according to the second embodiment.

FIG. 20 illustrates what is performed by an FC driver according to the second embodiment.

FIG. 21 is a flowchart of a blocking process performed by the FC driver according to the second embodiment.

When an I/O abort request (abort) is received from the target driver 130a, the FC driver 140a determines which target to block (step S1a). This decision may differ from request from request.

(1) In the case where the abort request is directed to a specific I/O, the target of that I/O is selected for blocking. (2) In the case where the abort request is directed to a specific disk array device, that target is selected for blocking. (3) In the case where the abort request is directed to a specific target, that target is selected for blocking.

The FC driver 140a then sends a PORT LOGOUT command to the selected target, thereby blocking communication with that target (step S2a).

Subsequently, the FC driver 140a returns an error to the target driver 130a unconditionally for all I/Os directed to the selected target, as well as deleting management data (SCSI level) of their I/O initiation request (step S3a).

The FC driver 140a then deletes Exchange records (FC-PH layer) of Fibre Channel communication related to every I/O directed to the selected target (step S4a).

The FC driver 140a waits for a fixed time by activating a timer, taking into consideration a path switching time that the I/O multipath controller 120 requires (step S5a). This wait time may be, for example, 60 to 180 seconds. Or it may be released by a manual command. During the period when this timer is active, the target driver 130a may issue a new I/O initiation request addressed to the target of interest. The FC driver 140a rejects such an I/O initiation request, if received, by immediately returning an error since the target cannot be reached. While the target may respond via the primary path, the FC driver 140a does not accept, but discards such responses.

Then, upon expiration of the timer, the FC driver 140a executes PORT LOGIN to the target device, thereby terminating its blocked state (step S6a).

According to the second embodiment, each block operates in response to requests from the upper layer as follows.

Figure 22:
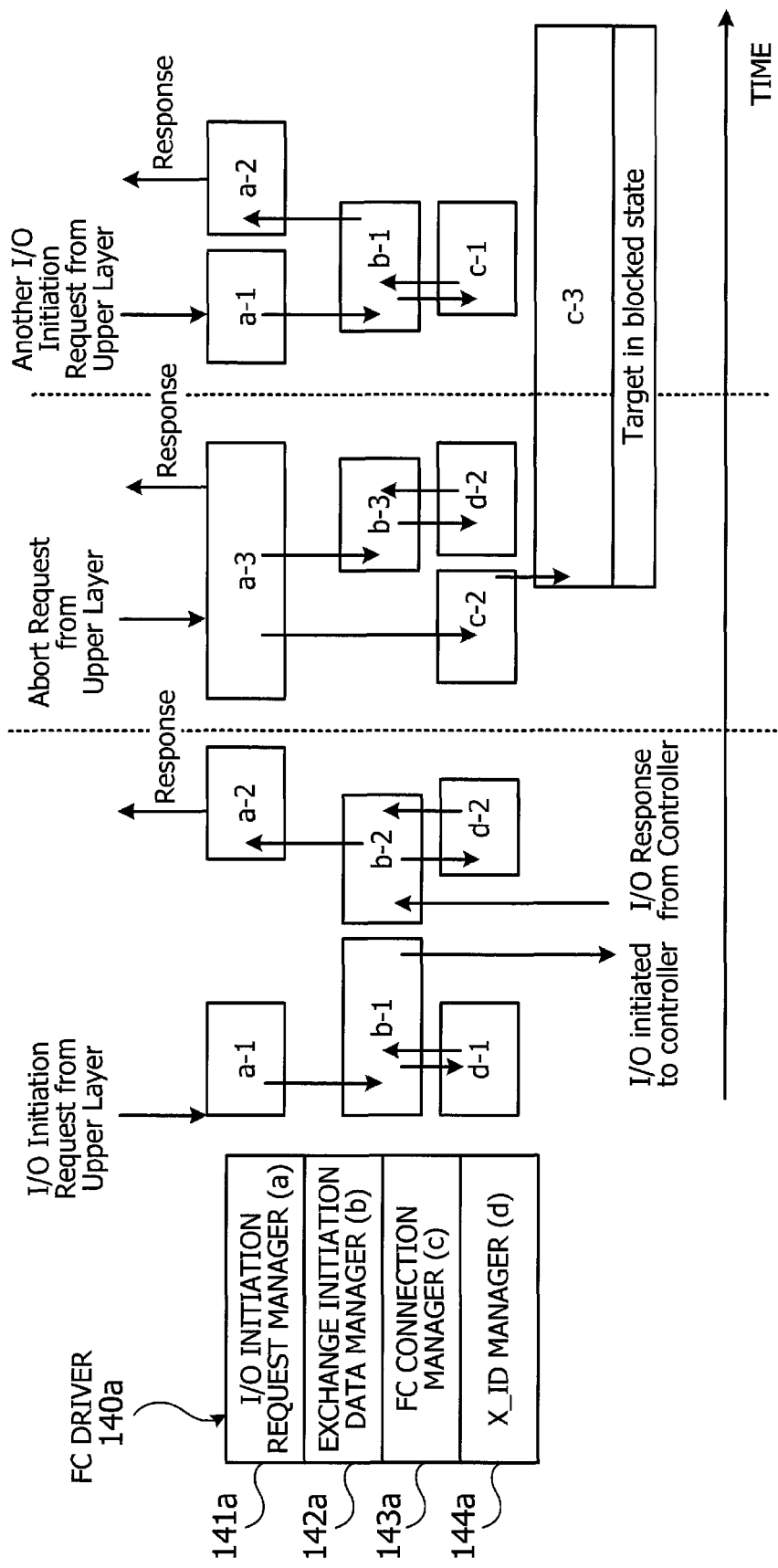
FIG. 22 is a sequence diagram illustrating what the FC driver performs according to the second embodiment.

FIG. 22 is a sequence diagram illustrating what the FC driver performs according to the second embodiment.

(α) Handling I/O Initiation Request from Upper Layer

To handle this request, the I/O initiation request manager 141a executes process a-1, the exchange initiation data manager 142a executes process b-1, and the X_ID manager 144a executes process d-1 as depicted in FIG. 22. As a result of these processes, I/O is initiated to the controller 310a. When an I/O response is received from the controller 310a, the exchange initiation data manager 142a executes process b-2, the I/O initiation request manager 141a executes process a-2, and the X_ID manager 144a executes process d-2, thereby returning a response to the upper layer.

<Process a-1> This process does the same as process A-1 of the first embodiment.

<Process b-1> This process does the same as process B-1 of the first embodiment.

<Process d-1> This process does the same as process D-1 of the first embodiment.

<Process b-2> This process does the same as process B-2 of the first embodiment.

<Process a-2> This process does the same as process A-2 of the first embodiment.

<Process d-2> This process does the same as process D-2 of the first embodiment.

(β) Handling I/O Abort Request from Upper Layer

To handle this request, the I/O initiation request manager 141a executes process a-3, and the FC connection manager 143a executes processes c-2 and c-3 as depicted in FIG. 22. As a result of these processes, the specified target is blocked for a predetermined time. In addition to the above, the exchange initiation data manager 142a executes process b-3, and the X_ID manager 144a executes process d-2, as a consequence of process a-3.

According to the second embodiment, the FC connection manager 143a has a blocking list describing blocked targets. When there is an I/O initiation request to a blocked target that has been added to the blocking list, the FC connection manager 143a rejects the request and immediately returns an error since it is unable to communicate with such a blocked target. While the target may respond via the primary path, the FC driver 140a does not accept, but discards such responses.

<Process a-3>

Figure 23:
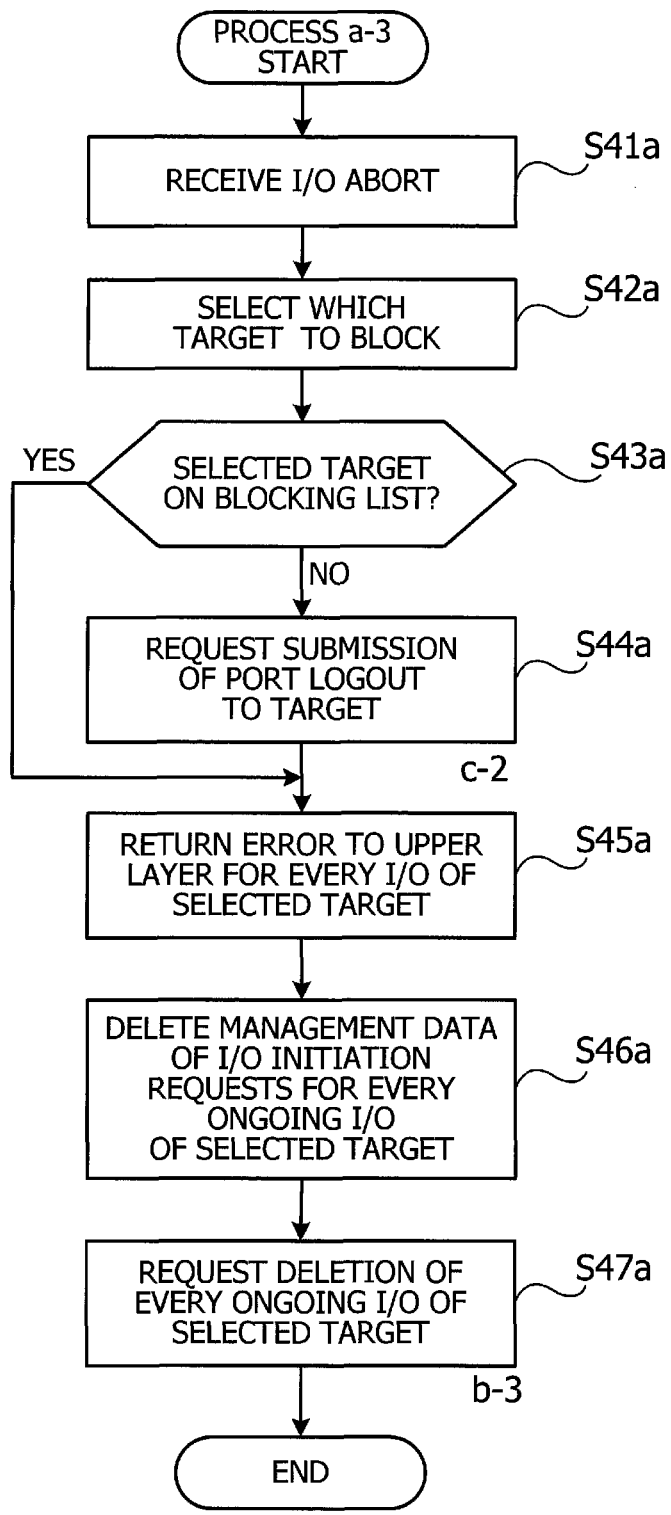
FIG. 23 is a flowchart of process a-3.

FIG. 23 is a flowchart of process a-3.

Upon receipt of an I/O abort from the upper layer (step S41a), the I/O initiation request manager 141a selects which target to block (step S42a).

The I/O initiation request manager 141a then determines whether the selected target is on the blocking list (step S43a).

If the selected target is not on the blocking list (No at step S43a), the I/O initiation request manager 141a requests the FC connection manager 143a to submit PORT LOGOUT to the selected target (step S44a), thus invoking process c-2. The I/O initiation request manager 141a then proceeds to step S45a.

If the selected target is on the blocking list (Yes at step S43a), the I/O initiation request manager 141a advances to step S45a.

Subsequently, the I/O initiation request manager 141a returns an error response to the upper layer for every ongoing I/O of the selected target (step S45a).

The I/O initiation request manager 141a further deletes management data of I/O initiation requests for every ongoing I/O of the selected target (step S46a).

The I/O initiation request manager 141a then requests the exchange initiation data manager 142a to delete every ongoing I/O of the selected target (step S47a), thus invoking process b-3. This concludes the process a-3.

<Process b-3> This process does the same as process B-3 of the first embodiment.

<Process c-2>

Figure 24:
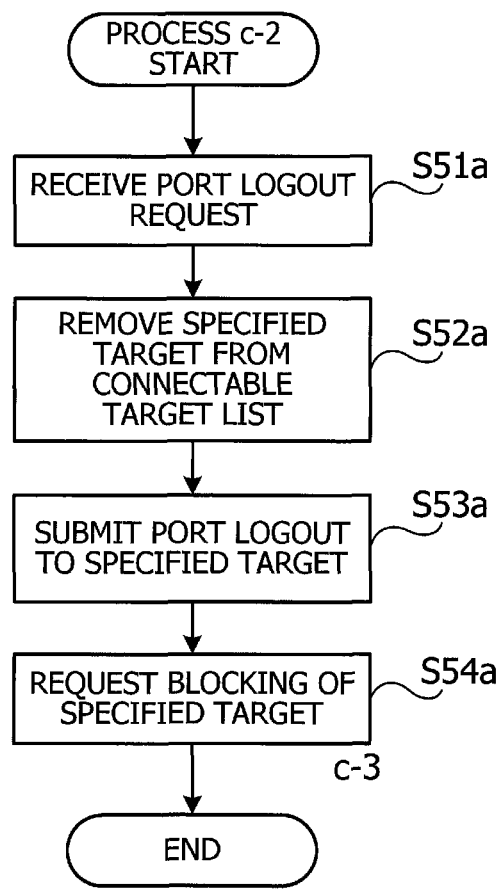
FIG. 24 is a flowchart of process c-2.

FIG. 24 is a flowchart of process c-2.

Upon receipt of a request for submission of PORT LOGOUT (step S51a) for a specific target, the FC connection manager 143a removes the entry of that target from the connectable target list (step S52a).

The FC connection manager 143a then submits PORT LOGOUT to that target (step S45a).

Subsequently, the FC connection manager 143a requests blocking of the specified target (step S54a) thus invoking process c-3. This concludes the process c-2.

<Process c-3>

Figure 25:
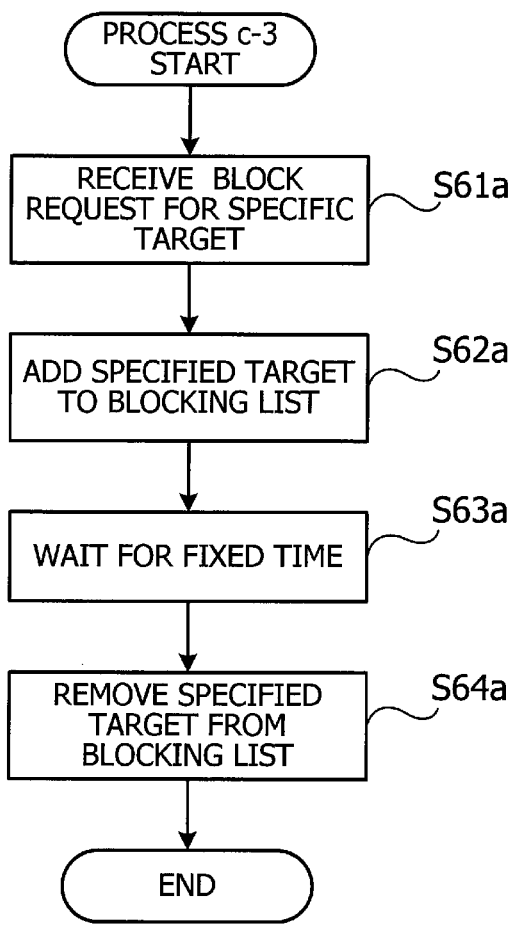
FIG. 25 is a flowchart of process c-3.

FIG. 25 is a flowchart of process c-3.

Upon receipt of a block request for a specific target (step S61a), the FC connection manager 143a adds an entry of that target to the blocking list (step S62a).

The FC connection manager 143a then waits for a fixed time (step S63a). This wait time may be, but not limited to, about 180 seconds.

The FC connection manager 143a removes the entry of the specified target from the blocking list (step S64a) thus ending the process c-3.

<Process d-2> This process does the same as process D-2 of the first embodiment.

(γ) Handling Another I/O Initiation Request from Upper Layer

To handle this request, the I/O initiation request manager 141a executes processes a-1 and a-2, the exchange initiation data manager 142a executes process b-1, and the FC connection manager 143a executes process c-1 as depicted in FIG. 22. As a result of these processes, an error notice is returned to I/O initiation requests if they are directed to the blocked target.

<Process a-1> This process does the same as process A-1 of the first embodiment.

<Process a-2> This process does the same as process A-2 of the first embodiment.

<Process b-1> This process does the same as process B-1 of the first embodiment.

<Process c-1>

Figure 26:
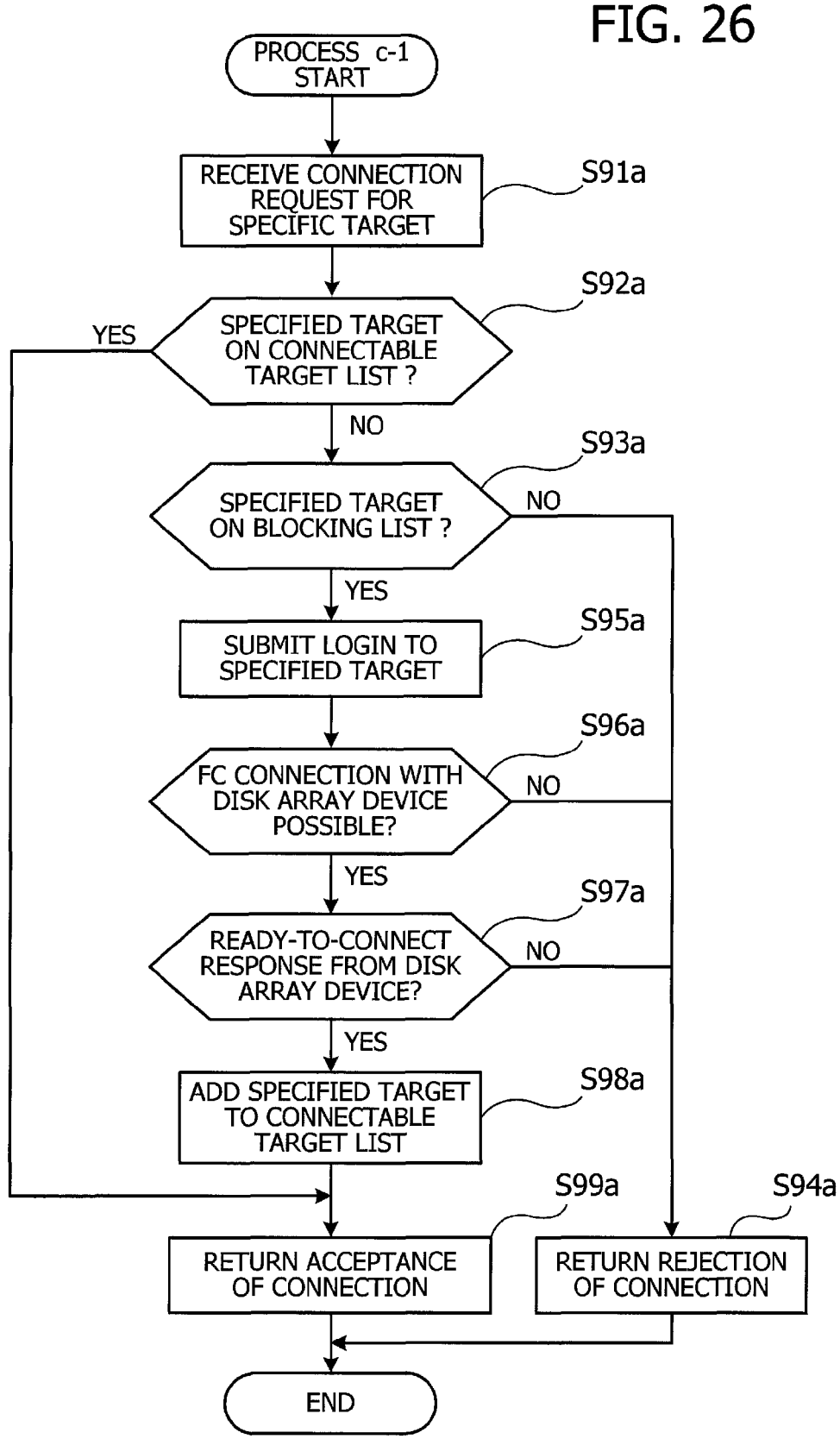
FIG. 26 is a flowchart of process c-1.
Figure 27:
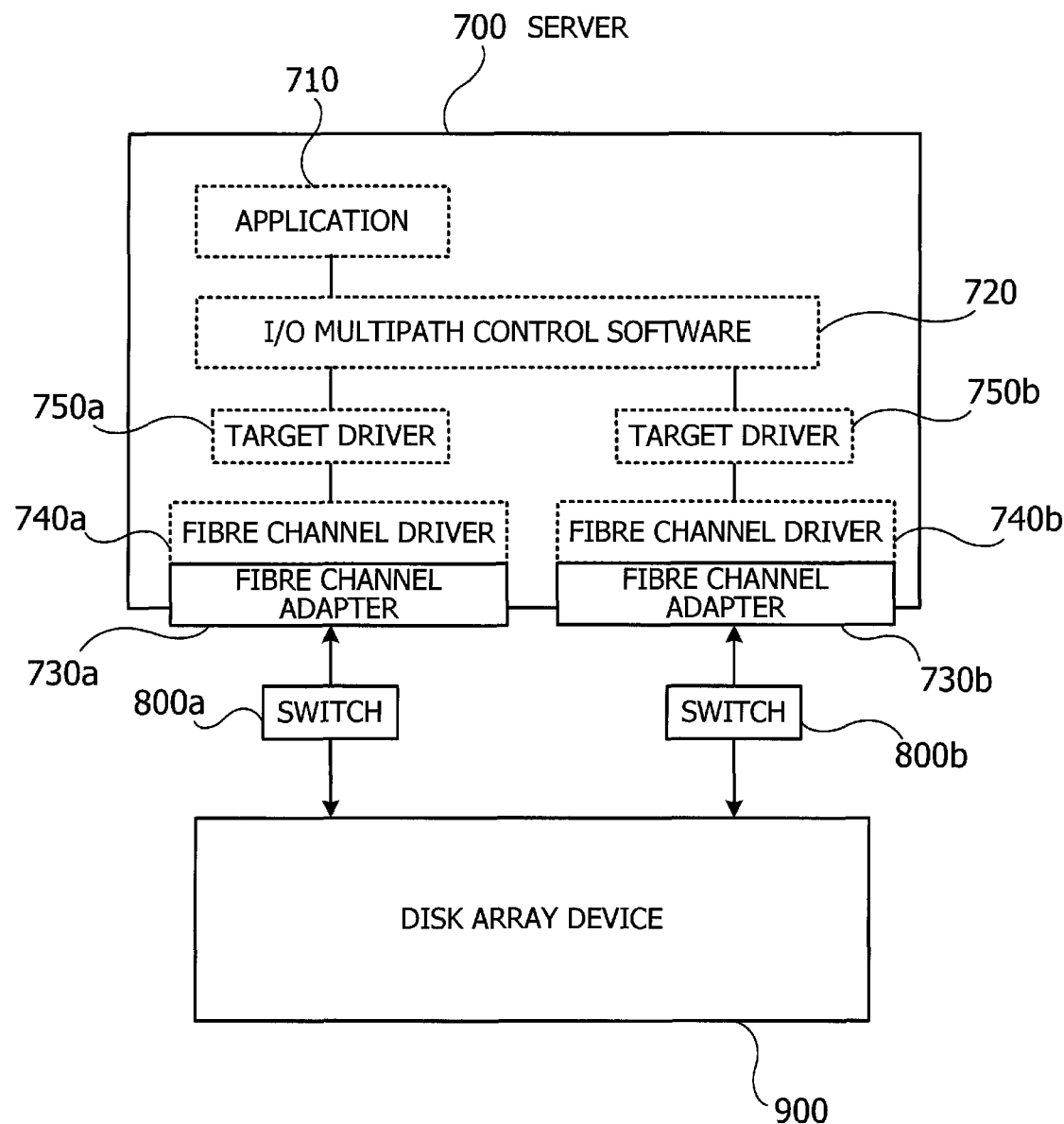
FIG. 27 illustrates a typical structure of Fibre Channel connections between a server and a disk array device.
Figure 28:
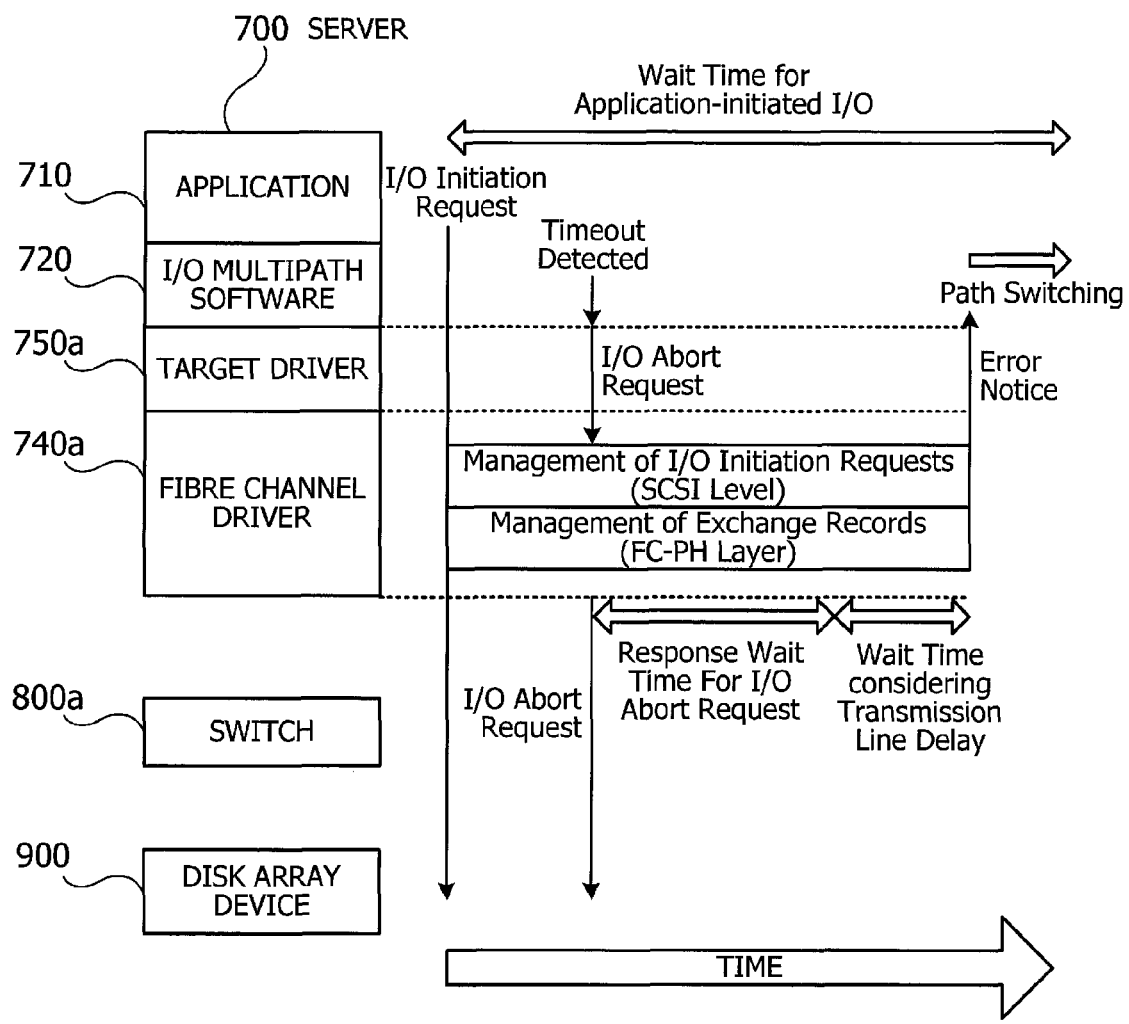
FIG. 28 illustrates a conventional process.
Figure 29:
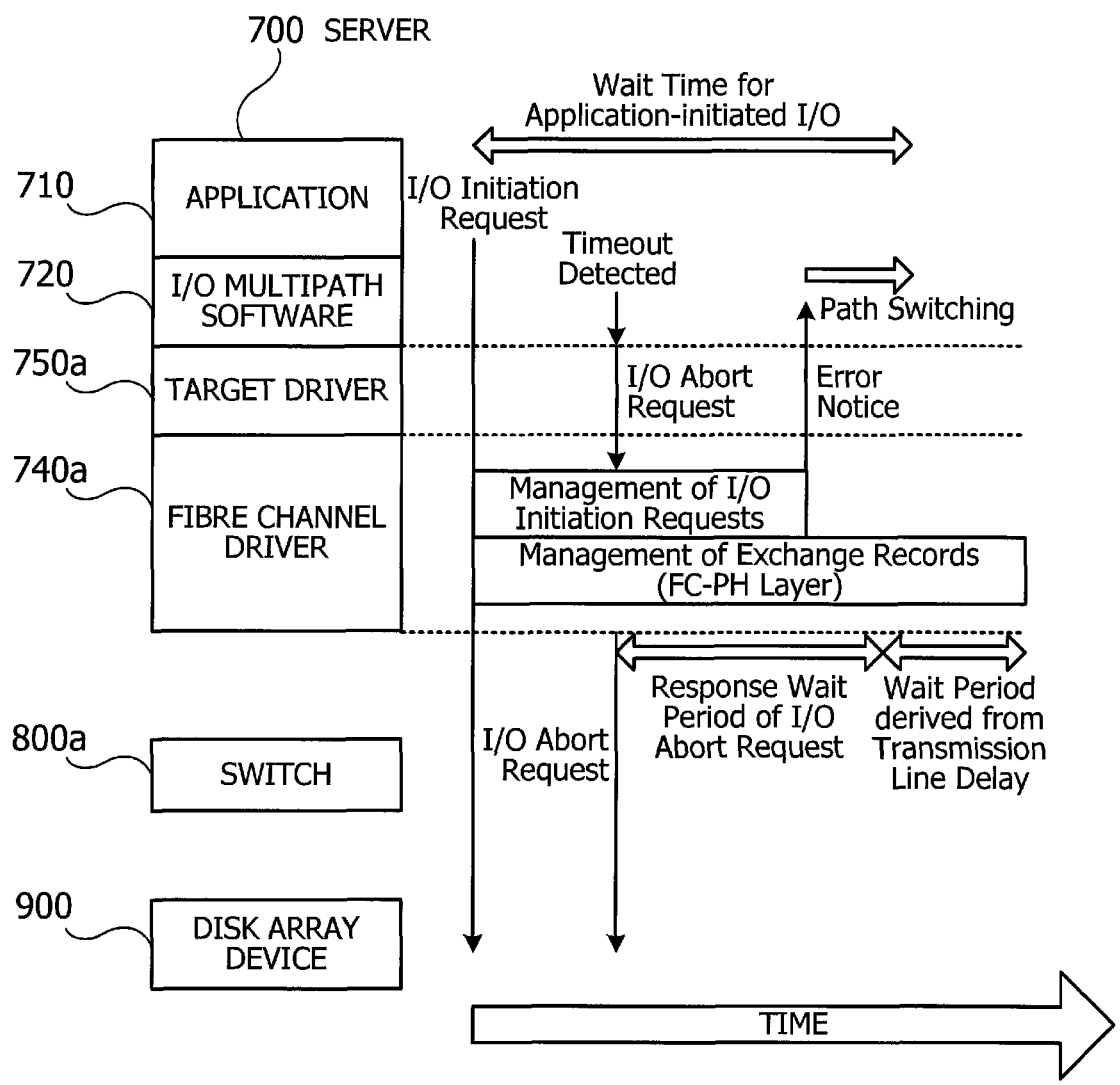
FIG. 29 illustrates another conventional process.

FIG. 26 is a flowchart of process c-1.

Upon receipt of a connection request to a specific target which may be blocked (step S91a), the FC connection manager 143a determines whether that target is on the connectable target list (step S92a).

If the specified target is on the connectable target list (Yes at step S92a), the process skips to step S99a (described later).

If the specified target is not on the connectable target list (No at step S92a), the FC connection manager 143a then determines whether the specified target is on the blocking list (step S93a).

If the specified target is not on the blocking list (No at step S93a), the FC connection manager 143a returns rejection of connection to the exchange initiation data manager 142a (step S94a), thus ending the process c-1.

If the specified target is on the blocking list (Yes at step S93a), the FC connection manager 143a submits LOGIN to the specified target (step S95a).

Subsequently, the FC connection manager 143a determines whether it is possible to establish an FC connection with the disk array device 300 (step S96a).

If it is not possible to establish an FC connection with the disk array device 300 (No at step S96a), then the process proceeds to step S94a.

If it is possible to establish an FC connection with the disk array device 300 (Yes at step S96a), the FC connection manager 143a determines whether the disk array device 300 has returned a response indicating its ready-to-connection status (step S97a).

If there is no ready-to-connect response from the disk array device 300 even after a predetermined time (No at step S97a), the process branches to step S94a.

If there is a ready-to-connect response from the controller 310a (Yes at step S97a), the FC connection manager 143a adds an entry for the specified target to the connectable target list (step S98a).

The FC connection manager 143a then returns a response indicating acceptance of connection back to the requester (i.e., exchange initiation data manager 142a) (step S99a), thus ending the process c-1.

The above-described communications system according to the second embodiment offers advantages similar to those of its counterpart in the first embodiment.

Furthermore, the communications system of the second embodiment offers more flexible control because of its target-based blocking operation.

The above-described processing functions are implemented on a computer platform. In other words, they are realized by running a communication processing program on a computer. This program describes what the server 100 is supposed to do. A computer executes the program to provide the foregoing processing functions. The program may be stored in a computer-readable storage medium. Such computer-readable storage media may include magnetic storage devices, optical discs, magneto-optical storage media, and semiconductor memory devices, for example. Magnetic storage devices include hard disk drives (HDD) flexible disks (FD), and magnetic tapes (MT), for example. Optical discs include digital versatile discs (DVD), DVD random access memory (DVD-RAM) compact disc read-only memory (CD-ROM), CD-Recordable (CD-R), and CD-Rewritable (CD-RW), for example. Magneto-optical storage media include magneto-optical discs (MO), for example.

Portable storage media, such as DVD and CD-ROM, may be used for commercial distribution of program products. Network-based distribution of software programs may also be possible, in which case the program is made available on a server computer for downloading to other computers via a network.

A computer stores a communication processing program in its local storage device, which has been installed from a portable storage media or downloaded from a server computer. The computer executes the program read out of the local storage device, thereby performing the programmed functions. As an alternative way of program execution, the computer may execute programs, reading out program codes directly from a portable storage medium. Another alternative method is that the computer dynamically downloads programs from a server computer when they are demanded and executes them upon delivery.

The present invention provides a path controller to submit an I/O abort request upon detection of a timeout, and a Fibre Channel driver to block every processing operation on a disk array specified by the request. These features permit an error notice to be immediately returned from the Fibre Channel driver to the target driver, so that the path controller can receive the error notice quickly and start path switching promptly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that various changes, substitutions, and alterations could be made hereto without departing from the spirit and scope of the invention.

What is claimed is:

1. A computer-readable, non-transitory medium storing a communication processing program for use in a server including Fibre Channel adapters for multiple-path connection with a disk array device, the communication processing program causing a computer to perform a procedure comprising:
    configuring a path for delivering I/O initiation requests from an application to the disk array device through layers of a path controller, a target driver, and a Fibre Channel driver in that order;
    issuing an I/O abort request from the target driver to the disk array device in response to a timeout of a path connection which is detected by the path controller that controls a plurality of paths to the disk array device;
    blocking, by the Fibre Channel driver, a port of the Fibre Channel adapters according to the I/O abort request from the target driver, as well as bringing all operations on the disk array device into a blocked state;
    during the blocking of the port, returning unconditionally an error from the Fibre Channel driver to the target driver as a response to each I/O request issued or to be issued from that port and deleting management data that the Fibre Channel driver has maintained for management of the I/O initiation requests; and
    switching the paths at the path controller in response to the errors unconditionally returned from the Fibre Channel driver to the target driver.

2. The computer-readable, non-transitory medium according to claim 1, wherein the Fibre Channel driver deletes every ongoing I/O involving the port in the blocked state.

3. The computer-readable, non-transitory medium according to claim 1, wherein the Fibre Channel driver resets management status of IDs used in ongoing I/O operations.

4. The computer-readable, non-transitory medium according to claim 1, wherein the Fibre Channel driver submits a port logout, in place of the I/O abort request, to a controller that is placed in the disk array device to control a disk to which the I/O abort request from the target driver is directed.

5. The computer-readable, non-transitory medium according to claim 4, wherein, in said blocking, the Fibre Channel driver returns an error unconditionally to the target driver as a response to each I/O initiation request directed to the disk and deletes management data that the Fibre Channel driver has maintained for management of the I/O initiation requests.

6. The computer-readable, non-transitory medium according to claim 4, wherein the Fibre Channel driver deletes every ongoing I/O operation on the disk in the blocked state.

7. The computer-readable, non-transitory medium according to claim 5, wherein the Fibre Channel driver resets management status of IDs used in the ongoing I/O operations.

8. A communication processing method for use in a server including Fibre Channel adapters for multiple-path connection with a disk array device, the communication processing method comprising:
    configuring a path for delivering I/O initiation requests from an application to the disk array device through layers of a path controller, a target driver, and a Fibre Channel driver in that order;
    issuing an I/O abort request from the target driver to the disk array device in response to a timeout of a path connection which is detected by the path controller that controls a plurality of paths to the disk array device;
    blocking, by the Fibre Channel driver, a port of the Fibre Channel adapters according to the I/O abort request from the target driver, as well as bringing all operations on the disk array device into a blocked state;
    during the blocking of the port, returning unconditionally an error from the Fibre Channel driver to the target driver as a response to each I/O request issued or to be issued from that port and deleting management data that the Fibre Channel driver has maintained for management of the I/O initiation requests; and
    switching the paths at the path controller in response to the errors unconditionally returned from the Fibre Channel driver to the target driver.

9. A communication processing device comprising:
    a plurality of Fibre Channel adapters to provide multiple-path connection with a disk array device; and
    a processor which performs a procedure comprising:
    configuring a path for delivering I/O initiation requests from an application to the disk array device through layers of a path controller, a target driver, and a Fibre Channel driver in that order;
    issuing an I/O abort request from the target driver to the disk array device in response to a timeout of a path connection which is detected by the path controller that controls a plurality of paths to the disk array device;
    blocking, by the Fibre Channel driver, a port of the Fibre Channel adapters according to the I/O abort request from the target driver, as well as bringing all operations on the disk array device into a blocked state;
    during the blocking of the port, returning unconditionally an error from the Fibre Channel driver to the target driver as a response to each I/O request issued or to be issued from that port and deleting management data that the Fibre Channel driver has maintained for management of the I/O initiation requests; and
    switching the paths at the path controller in response to the errors unconditionally returned from the Fibre Channel driver to the target driver.

* * * * *